(12) United States Patent
Kim

(10) Patent No.: US 6,737,620 B2
(45) Date of Patent: May 18, 2004

(54) MICROWAVE OVEN HAVING A COFFEE MAKER

(75) Inventor: Dae Sik Kim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/378,752

(22) Filed: Mar. 5, 2003

(65) Prior Publication Data

US 2003/0168446 A1 Sep. 11, 2003

(30) Foreign Application Priority Data

| Mar. 5, 2002 | (KR) | 2002-11704 |
| Jul. 29, 2002 | (KR) | 2002-44690 |
| Aug. 10, 2002 | (KR) | 2002-47326 |

(51) Int. Cl.[7] .................................................. H05B 6/64
(52) U.S. Cl. ........................ 219/679; 219/689; 219/722; 219/739; D7/351
(58) Field of Search ................... 219/678, 679, 219/680, 682, 681, 685, 687, 688, 689, 736, 739, 752, 753, 756, 758; 126/273 A; 99/DIG. 14, 341; D7/350.1, 350.3, 350.4, 351, 402, 405, 406

(56) References Cited

U.S. PATENT DOCUMENTS

D340,831 S * 11/1993 Manabe ...................... D7/305
D479,431 S * 9/2003 Jung et al. .................... D7/351
2003/0168447 A1 * 9/2003 Lee ............................ 219/722

FOREIGN PATENT DOCUMENTS

| JP | 63-299088 | * 5/1987 | ............ H05B/11/00 |
| JP | 06-76946 | * 8/1992 | ............ H05B/11/00 |

* cited by examiner

Primary Examiner—Tu Ba Hoang
(74) Attorney, Agent, or Firm—Birch, Stewart, Kolasch & Birch, LLP

(57) ABSTRACT

Disclosed is a microwave oven having a coffee maker installed in an electronic device chamber. A cavity door is provided in front of a cavity. The electronic device chamber in which electrical elements are installed is provided adjacent to the cavity. A casing of the coffee maker is provided in front of the electronic device chamber. A water tank is provided within the casing. A funnel is provided so that the funnel can enter and go out of the interior of the casing. A container is comprised of a jug or cup. A heater is provided in a lower portion of the casing. A water supply tube has one end connected with the water tank, body portion passing through the lower portion of the casing so as to contact with the heater, and the other end arranged at the upper portion of the funnel.

74 Claims, 13 Drawing Sheets

MICROWAVE OVEN HAVING A COFFEE MAKER

This application claims the benefit of the Korean Application Nos. P2002-11704 filed on Mar. 5, 2002, P2002-44690 filed on Jul. 29, 2002 and P2002-47326 filed on Aug. 10, 2002, which is hereby incorporated by reference.

BACKGROUND OF THE INVENTION

1. Field of the Invention

The present invention relates to a microwave oven, and more particularly, to a microwave over having a coffee maker provided in a predetermined space of the electronic device chamber.

2. Discussion of the Related Art

A microwave oven is an apparatus for thawing and heating foods by microwave. FIG. 1 is an exploded perspective view of a general microwave oven. Referring to FIG. 1, the microwave oven includes a cavity 2, an electronic device chamber 10, a housing 4, a door 3, a magnetron 11, a transformer 12 and a blower 13.

Cavity 2 is a space accommodating foods therein and has an opened front so as to introduce or withdraw foods. Electronic device chamber 10 is arranged adjacent to the cavity 2, and is provided therein with a variety of elements including the magnetron 11, the transformer 12, and the blower 13. Magnetron it is supplied with a power of a high voltage from an outside to generate a microwave. Transformer 12 converts a power supplied from the outside to a power of a high voltage and supplies the converted power or high voltage to the magnetron 11. Blower 13 cools the variety of elements installed within the electronic device chamber 10, and forms an air flow passing through the interior of the cavity 2. Housing 4 is provided to enclose the cavity 2 and the exterior of the electronic device chamber 10, and door 3 is coupled at the front of the electronic device chamber 10 with the cavity 2 to open and close the opened front of the cavity 2. Door 2 is also provided with a transparent door glass so that the interior of the cavity 2 can be viewed through the opened front In the meanwhile, in a recent trend, a rotatable tray is provided on the bottom surface of the cavity 2. For this purpose, a variety of elements including a motor for rotating the tray are provided together. Thus, in addition to the foregoing elements, many elements are provided in the microwave oven, but their detailed description will be omitted.

The microwave oven constructed as above operates as follows.

First, door 3 is opened, foods are introduced into the cavity 2 and the door 3 is closed. Control panel (not shown) is manipulated to operate the microwave oven. As the microwave oven Operates, the transformer 12 converts power to a high voltage and applies the converted high voltage to the magnetron 11. Magnetron 11 is supplied with the high voltage to generate a microwave, and irradiates the generated microwave into the cavity 2. The microwave irradiated into the cavity 2 vibrates water molecules of the foods to heat the foods. As the microwave is irradiated into the foods for a constant time interval, the foods are thawed or cooked while they continue to be heated.

Since the aforementioned conventional microwave oven thaws or heats foods by using a principle in which water molecules of the foods are vibrated, it fails to perform a variety of cookings. For instance, the conventional microwave oven fails to cook the coffee which the moderners enjoy drinking. In other words, for enjoying drinking the coffee, it is requested that the coffee maker be used.

In the meanwhile, as the urbanization deepens in recent years, there appears a tendency in which the living space is narrowed and practicability is pursued. As a result, it is also requested that a variety of living necessaries including the electric home appliances be made in a compact construction. In addition, there are being requested electric home appliances capable of performing various supplementary functions as well as the traditional original functions. However, the conventional microwave oven fails to satisfy such consumers' desires.

SUMMARY OF THE INVENTION

Accordingly, the present invention is directed to a microwave oven having a coffee maker that substantially obviates one or more problems due to limitations and disadvantages of the related art.

An object of the present invention is to provide a microwave oven having a coffee maker constructed to perform the function of the coffee maker while the microwave oven is maintained at the same size as the conventional one.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a microwave oven having a coffee maker includes a cavity of which front is opened; a cavity door for opening/closing the opened front of the cavity; an electronic plurality of elements are installed to radiate microwaves into the cavity; a casing of which front is opened and provided at a front side of the interior of the electronic device chamber; a water tank provided within the casing; a funnel provided so that the funnel can enter and go out of the interior of the casing; a heater provided in a lower portion of the casing; a water supply tube being provided whose one end is connected to the water tank, the other end is positioned at the upper side of the funnel, and a part thereof is in contact with the heater; and a container provided below the funnel so that the container can enter and go out of the interior of the casing.

In an aspect of the present invention, the microwave oven further includes a casing door for opening/closing the opened front of the casing. Here, the casing door is hinge-coupled at one side of the front of the casing, and has a surface that is continuous with the cavity door.

In an aspect of the present invention, the microwave oven further includes a front cover having an opening communicating the interior of the casing with an outside of the casing. Alternatively, the microwave oven further includes a cover door completely or partially opening/closing the opening of the front cover. Also, the front cover has a surface that is continuous with the cavity door.

Preferably, the casing further includes a bracket protruded from an inner wall to an inner space so as to serve as a shelf.

The water tank rotates around a hinge and is hinge-coupled with the casing so that the water tank can enter and go out of the interior by pushing and pulling.

In an aspect of the present invention, the water tank and the funnel are formed in a single body. Here, the funnel is comprised of an outer circumferential surface made concavely in a cone shape. Also, the water tank further comprises a water tank cover formed at an upper portion of the water tank, for opening/closing an entrance of the water tank.

In the meanwhile, the container may be made in a jug. In this case, the funnel further includes a coffee discharge valve which is opened by the jug being pushed when the jug is accommodated within the casing.

The coffee discharge valve comprises: an opening/closing member inserted movably up and down into a drop hole formed at a lower portion of the funnel and moved by the jug to open/close the drop hole; and a spring arranged between the opening/closing member and the funnel, and providing an elastic force to the opening/closing member so as to be closely in contact the opening/closing member.

The opening/closing member comprises: a stick provided so as to penetrate the drop hole formed at the lower portion of the funnel; a second end portion widely formed at one end of the stick rib and pushed up by the jug; and a first end portion widely formed at the other end of the stick, for opening the drop hole when the second end portion is pushed up in a state that the first end portion closes the drop hole.

The spring is provided between the second end portion and the funnel.

The coffee discharge valve further comprises an O-shaped ring provided between the lower portion of the funnel and the first end portion so that the first end portion can completely close the drop hole.

The second end portion has a lower surface shaped in a bowl so as to decrease friction when the second end portion is in contact with the jug. Also, the second end portion further comprises a plurality of penetration holes formed so as to drop coffee that is introduced through the drop hole and then stays in an upper surface thereof rib.

In the meanwhile, the water tank is pushed and opened by one end of a water supply tube when the water tank is mounted in the casing, to supply water to the water supply tube.

The water supply valve comprises: a valve body an inner space, an inlet through which the water is introduced, and an outlet through which the water is drained; a flow passage control plate movably inserted into the inner space of the valve body and which is pushed by one end of the water supply tube in a state that the flow passage control plate closes the outlet, to communicate the inlet with the outlet; and a valve spring inserted into an inner space of the valve body and providing an elastic force such that the flow passage control plate is closely in contact with the outlet side.

The water supply valve further comprises an O-shaped ring provided on an inner circumferential surface of the valve body arranged between the outlet and the flow passage control plate, for preventing leakage.

Also, the water supply tube further comprises a pressing pin extending from one end thereof, for opening the outlet of the valve body by pushing the flow passage control plate of the water supply valve when the water tank is mounted in the casing. Here, the one end of the water supply tube has an inner diameter greater than an outer diameter of the valve body such that the valve body is inserted into the interior thereof. Also, the water supply tube further comprises an O-shaped ring provided on an inner circumferential surface of the one end of the water supply tube, for preventing leakage when the valve body is inserted into the one end of the water supply tube.

The water supply tube further comprises a check valve provided therein to prevent water from flowing backward toward the water tank.

The casing further comprises a heating plate contacting with the heater, constituting an inner bottom surface and heated by the heater.

In an aspect of the present invention, the jug includes: a jug body of which the upper side is opened, for receiving and storing coffee dropping from the funnel; and a handgrip extending from one side of the jug body. Alternatively, the jug comprises: a rim reinforcing member provided along inner and outer circumferences of the opened upper side of the jug body; and a jug cover provided so as to open and close the opened upper side of the jug body, and having an introducing hole penetratedly formed such that the coffee dropping from the drop hole of the funnel passes through.

The jug further comprises at least one hanger extending from the rim reinforcing member so as to fix and hang an object.

The jug further comprises an egg poacher accommodating at least one egg therein, of which part is fixed to the hanger and fixed within the jug body, and comprised of a net.

The egg poacher comprises: a first member having a concave curved surface for accommodating approximate half of an outer circumferential surface of the egg; and a second member having a shape corresponding to the shape of the first member, and hinge-coupled with the first member.

The egg poacher further comprises at least one fixing piece which extends from the first member or the second member, and is inserted into the hanger to fix the egg poacher.

The egg poacher further comprises: a hook protruded from the first member; and a second member protruded from the second member such that the hook is hanged and fixed when the second member and the first member are folded.

Alternatively, the first and second members have a single concave curved surface formed elongatedly so as to accommodate the eggs in one column therein, or two concave curved surface formed elongatedly and parallel with each other so as to accommodate the eggs in two columns therein.

Also, the first and second members further comprise a horizontal member protruded inwardly from the concave curved surface to support both sides of the egg mounted in the egg poacher and thus prevent the eggs in the egg poacher from being moved.

The horizontal members are arranged at a narrow interval so as to support both sides of the egg in the width direction, or arranged at a wide interval so as to support both sides of the egg in the length direction.

In the meanwhile, the jug comprises a plurality of racks horizontally protruded from the rim reinforcing member toward the interior of the jug body. At this time, the rack comprises a slit cut inwardly from an outer circumferential surface thereof so as to fix a string connected to a tea bag or a tea infuser, or comprises a fixing groove cut in a wedge shape inwardly from an outer circumferential surface thereof so as to fix a string connected to a tea bag or a tea infuser.

The jug further comprises a tea strainer in which tea is received and of which part of upper portion is mounted on the rack and supported such that a lower portion thereof is dipped in the water contained in the jug body. Here, the tea strainer comprises: a mesh shaped in a container and of which the upper side is opened; and a flange formed along the opened upper circumference of the mesh.

In the meanwhile, the funnel further comprises a coffee flow passage having a plurality of coffer discharge holes formed at the lower portion of the funnel, through which the coffee filtered in the funnel flows, and discharging the coffee in the downward direction.

The container is a plurality of cups provided at the lower portion of the coffee discharge holes of the funnel.

In an aspect of the present invention, the microwave oven further comprise a cup holder on which the plurality of cups are mounted, and provided so that the water tank can enter and go out of the interior by pushing and pulling.

The casing further comprises a guide groove concavely formed on both inner surfaces of the casing so that both ends of the cup holder can be inserted, to guide the entering and going out of the cup holder.

Alternatively, the cup holder comprises a plurality of standing grooves provided in the upper surface of the cup holder such that the lower portions of the cups are inserted and supported, or includes a plurality of standing grooves provided to penetrate the cup holder such that the cups are inserted and supported.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SYMBOLS IN MAIN PORTIONS OF THE DRAWINGS*

| 20 | Cavity |
|---|---|
| 40 | Cavity door |
| 50 | Electronic device chamber |
| 100 | Casing |
| 200 | Water tank |
| 250 | Water supply valve |
| 300 | Funnel |
| 340 | Coffee discharge valve |
| 400 | Jug |
| 450 | Egg poacher |
| 490 | Tea strainer |
| 500 | Water supply tube |
| 600 | Heater |
| 700 | Cup |
| 750 | Cup holder |

Figure 5:
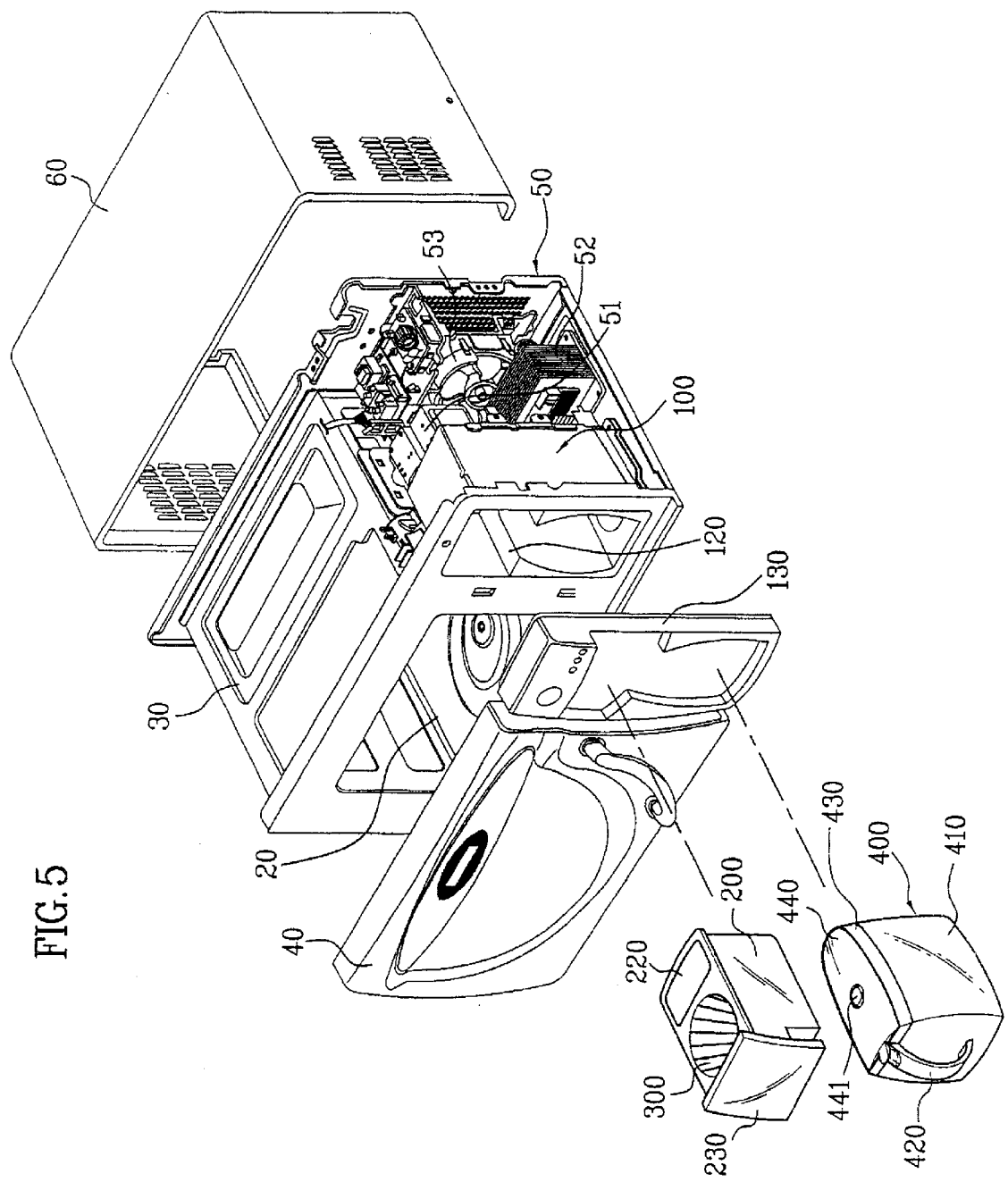
FIG. 5 is a partial exploded perspective view showing the structure of a microwave oven according to a second embodiment of the present invention.

*Representative Drawing: FIG. 5

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

First embodiment of the present invention provides a microwave oven having a coffee maker installed in an electronic device chamber. Since the structural features of the first embodiment of the invention are well shown in FIGS. 2 to 4, the structure of the first embodiment will be described with reference to such the drawings.

Figure 1:
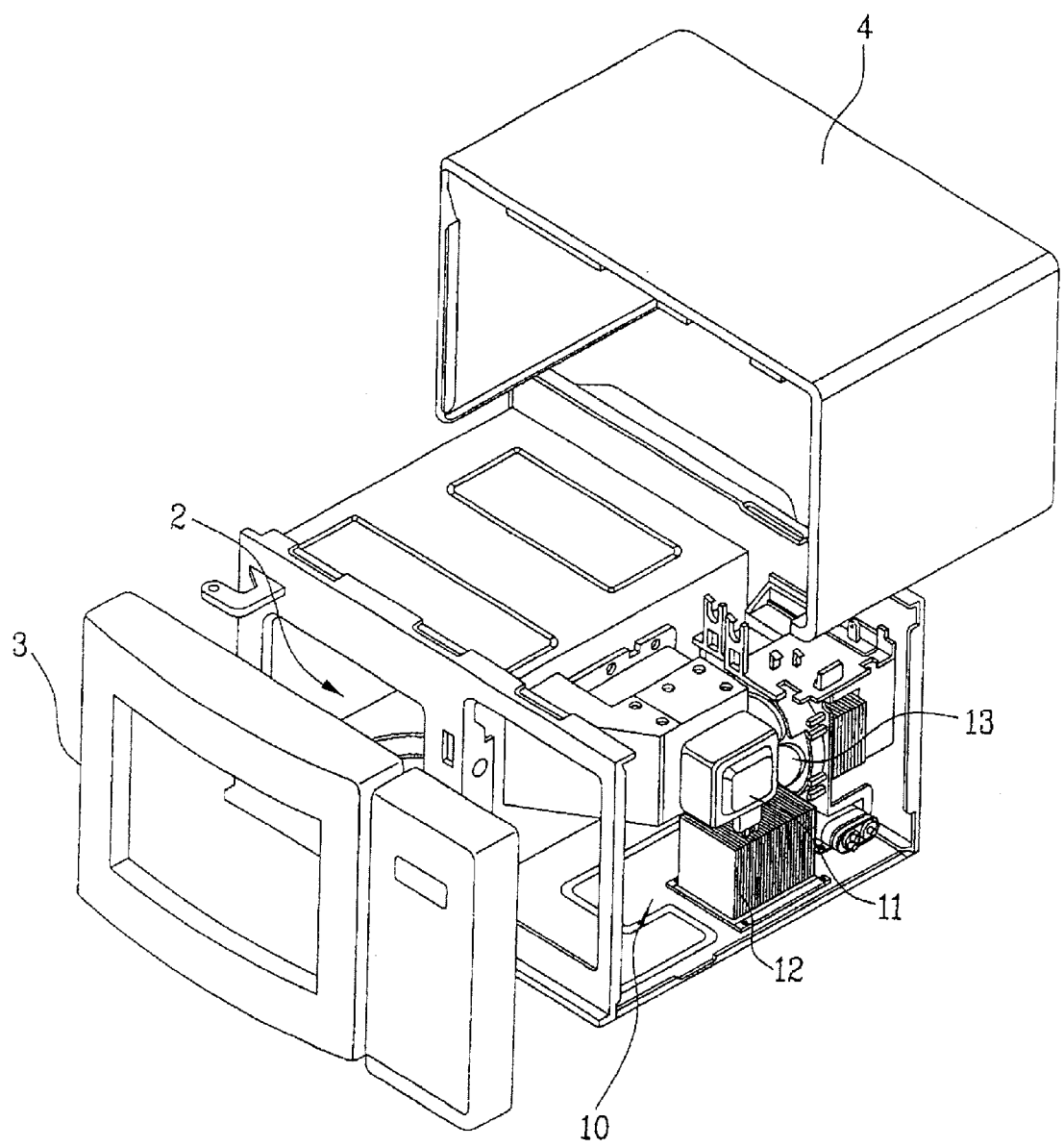
FIG. 1 is an exploded perspective view of a general microwave oven.
Figure 2:
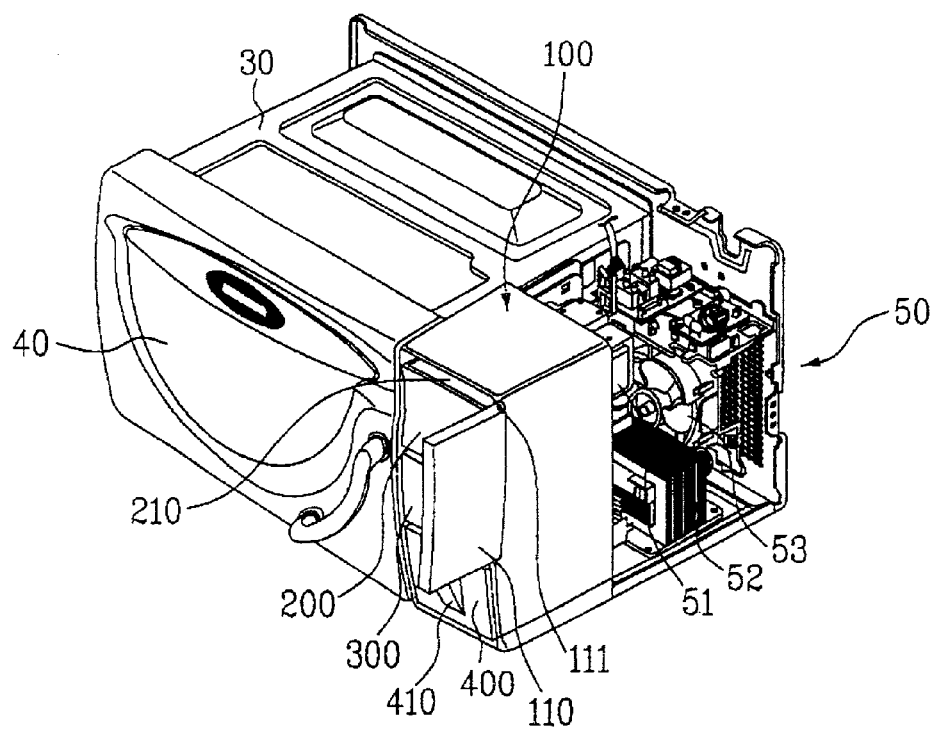
FIG. 2 is a partial exploded perspective view showing the structure of a microwave oven according to a first embodiment of the present invention.
Figure 3:
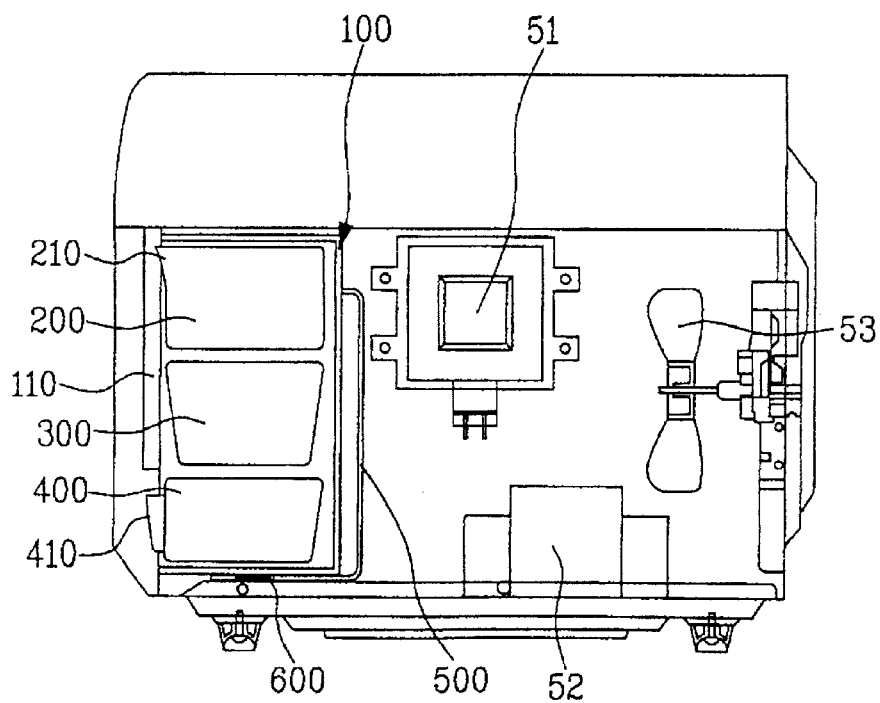
FIG. 3 is a partial side sectional view showing the structure of a microwave oven according to a first embodiment of the present invention.
Figure 4:
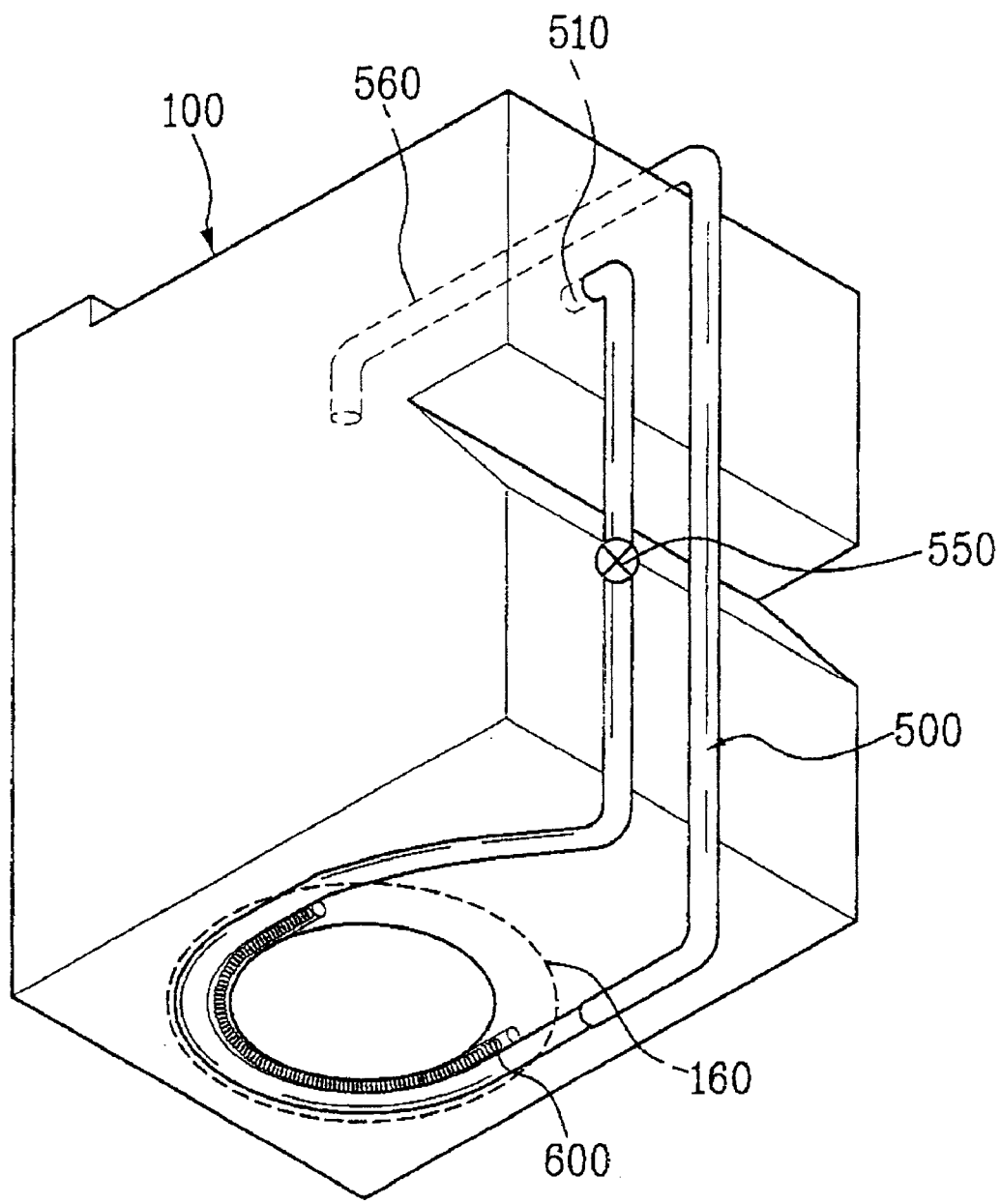
FIG. 4 is a perspective view of a microwave oven according to the present invention when the casing is viewed from the lower side.

As shown in FIGS. 2 to 4, a microwave oven according to the first embodiment of the present invention includes a cavity (not shown), a cavity door 40, an electron device chamber 50, a casing 100, a water tank 200, a funnel 300, a heater 600, a water supply tube 500 and a jug 400.

Cavity is formed so as to have a predetermined space within a frame 30. The front of the cavity is opened. Cavity door 40 is hinge-coupled to one edge of the front of the cavity so as to opening/close the opened front of the cavity. Tray (not shown) is rotatably provided on the bottom surface of the cavity. The tray as provided rotates foods so that microwave can be uniformly irradiated onto the foods to obtain an improved heating characteristic.

Electronic device chamber 50 is provided adjacent to the cavity, for instance, at a side portion of the cavity. Inside the electronic device chamber 50, a plurality of electrical elements are installed to radiate microwaves into the cavity and thus cook the foods accommodated in the cavity. For example, inside the electronic device chamber 50, a variety of elements including a magnetron 51, a transformer 52, a blower 53 and a motor (not shown) are installed.

Here, transformer 52 is supplied with an external power to convert the external power to a power of a high voltage, and magnetron 51 is supplied with the power of high voltage from the transformer 52 to generate microwave and irradiate the generated microwave into the cavity through an antenna (not shown). The motor is supplied with an external power to rotate the tray. Blower 53 blows external airs toward the elements installed within the electronic device chamber 50, in particular, toward the magnetron 51 and the transformer 52 that radiate a lot of heat to cool these elements. In addition, blower 53 functions to generate flow passage of air that passes through the cavity and is drained to the exterior.

Casing 100 has therein a space capable of accommodating the water tank 200, the funnel 300, the jug and the like. Casing 100 has an opened and is, as shown in FIG. 2, provided at a front side of the interior of the electronic device chamber 50. In order to provide the casing 100 within the electronic device chamber 50, electrical elements of magnetron 51, transformer 52, blower 53, motor and the like are arranged closer to the rear of the electronic device chamber 50 than those of the conventional microwave oven. In the microwave oven according to the present invention, since the plurality of elements are arranged closely within the electronic device chamber 50, it is preferable to improve cooling performance of the electronic device chamber 50 compared with the conventional microwave oven by improving the structure of the cooling passage.

As shown in FIGS. 2 and 3, water tank 200 is provided within the casing 100. Water tank 200 has therein a water storage space and is arranged at the upper side of the inner space of the casing 100. Water tank 200 is made in such a construction that as inserted into the casing 100, it has an entrance 210 exposed toward the open front of the casing 100 or is hinge-coupled to one edge of the front of the casing 100 so that it can enter and go out of the interior of the casing 100 by pulling and pushing with rotating around a hinge (not shown).

As shown in FIGS. 2 and 3, if the water tank 200 has the entrance 210 exposed toward the exterior, it is possible to supply water in a state that the water tank 200 is not withdrawn. In the meanwhile, the entrance 210 may be constructed so as to be exposed directly to the exterior or to be exposed whenever the casing door 110 opening and closing the front of the casing 100 is opened. In case the entrance 210 is exposed directly to the exterior, it is preferable that the water tank 200 is provided with an entrance opening/closing cork (not shown) for opening/closing the entrance 210. Also, as shown in FIG. 2, in case the casing door 110 is provided at the front side of the casing 100, it is preferable that the entrance 210 is exposed to the exterior when opening the casing door 110 and is not exposed when closing the casing door 110. Of course, it is requested that the entrance 210 and the casing door 110 should be designed not to interfere with each other when closing the casing door 110.

In the meanwhile, although not shown in the drawings, if the microwave oven is constructed such that the water tank 200 is hinge-coupled to the casing 100, in case it is intended to supply water into the water tank 200, the water tank 200 is rotated around the hinge to withdraw the water tank 200 and supply water to the water tank 200 through an inlet (not shown) formed at one side of the water tank 200. If rotating the water tank 200 around the hinge after supplying water to the water tank 200, the water tank 200 is received within the casing 100 to thereby enable a very convenient use.

Also, although not shown in the drawings, the water tank 200 may be constructed to supply water after it is completely withdrawn. In this construction, there is no need that the entrance of the water tank 200 is exposed to the exterior when the water tank 200 is received within the casing 100.

Figure 13:
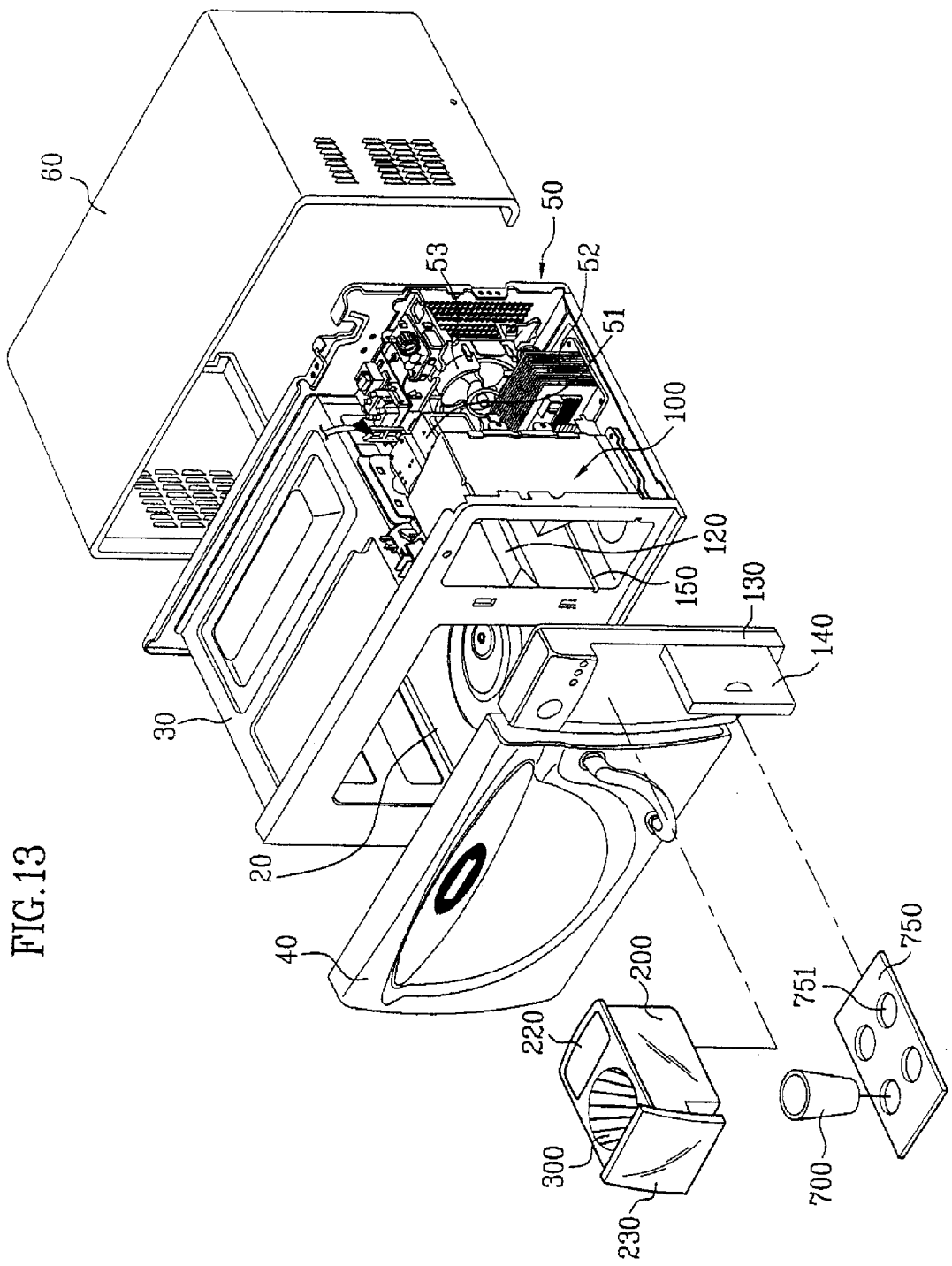
FIG. 13 is a partial exploded perspective view showing a structure according to a third embodiment of the present invention.

Water tank 200 may be provided such that a part thereof is fixed to the casing 100, but may have a construction that the water tank 200 is completely separated from the casing 100. In the structure that the water tank 200 is completely separated from the casing 100, a bracket for supporting the water tank 200 is provided. Although the figures of the first embodiment do not show this bracket, the bracket is well shown in FIG. 5 and FIG. 13 illustrating second and third embodiments. As shown in FIGS. 5 and 13, brackets protruded to face with each other from both sides of the inner wall of the casing 100 toward an inner space serve as a shelf to support and fix the water tank 200 from the lower side of the water tank 200. By installing the bracket constructed as above, the invention can provide a microwave oven having a simple and economical construction since it becomes possible that a user can withdraw the water tank 200 to the exterior, supply water and again accommodate the water tank such that the water tank 200 is supported by the bracket.

Funnel 300 is provided so that it can enter and go out of the interior of the casing 100 by pulling and pushing. In the first embodiment, as shown in FIGS. 2 and 3, the funnel is constructed such that a body separated from the water tank 200 is manufactured and arranged below the water tank 200.

Although the inner structure of the funnel 300 is not shown in detail in FIGS. 2 and 3, the funnel 300 of the first embodiment has a similar to that of a general coffee maker. In other words, the funnel 300 has a cone shape in which the inner circumferential diameter of the upper portion is greater than the inner circumferential diameter of the lower portion. Inside the funnel 300 constructed as above, a filter (not shown) made of paper, non-woven fabric or the like is installed, and a coffee powder is received on the filter. As hot water is supplied to the funnel 300, the coffee powder is dissolved and the dissolved coffee solution passes through the filter and is dropped downward. For this purpose, a drop hole to which the liquid coffee in a solution state drops is provided below the funnel 300. If necessary, a coffee discharge valve for opening/closing the drop hole by an external force may be further provided. The structure for dropping the coffee solution will be described in detail in the following second and third embodiments.

In the meanwhile, the first embodiment of the invention provides a jug 400 as a container for storing the coffee solution dropped from the funnel 300. Jug 400 is provided below the funnel 300 so as to enter and go out of the interior of the casing 100 by pushing and pulling. Jug 400 is shaped in a container and has a handgrip 410 formed on one side thereof. Hence, a user can introduce or withdraw the jug 400 into the casing 100 with easy with holding the handgrip 410. Jug 400 is preferably made of transparent glass or plastic so that the amount of the coffee solution stored therein can be recognized with ease. Concrete constitution of the jug 400 will be described in more detail in the second and third embodiments.

Heater 600 is, as shown in FIG. 4, provided at the lower portion of the casing 100 to heat the jug 400 mounted on the bottom surface of the casing 100. Hence, the coffee stored in the jug 400 is always maintained at a hot state by the heat transferred from the heater 600.

In the meanwhile, in the first embodiment of the invention, a heating plate 160 is further provided. As shown in FIG. 4, the heating plate 160 forms the inner bottom surface of the casing 100, and it is heated by a contact with the heater 600 and transfers the heat to the jug 400. For this purpose, the heating plate 160 is preferably made of material having a superior heat transfer performance. A connection portion between the heating plate 160 and another portion of the casing 100 is preferably made of insulator to prevent the heat of the heater 600 from being transferred to a portion other than the heating plate 160.

Water supply tube 500 is provided whose one end 510 is connected to the water tank 200, the other end 560 is positioned at the upper side of the funnel 300, and a part thereof is in contact with the heater 600. In more detail, one end of the water supply tube 500 is connected to the bottom surface or the lower side portion of the casing 100. The body portion of the water supply tube 500 is led out to the exterior of the casing 100, contacts by a predetermined area with the heater 600 provided in the lower portion of the casing 100, and is again led in to the interior of the casing 100. The other end 560 of the water supply tube 500 is positioned over the funnel 300. At this time, the other end 560 through which water is discharged is installed higher than the one end through which water is introduced. This is to prevent that the water stored in the water tank 200 is discharged through the other end 560 in a non-heated state by a simple pressure difference. If the water supply tube 500 is installed as above, the water stored in the water tank 200 is introduced through the one end 510 of the water supply tube 500, is heated while passing through the contact portion with the heater 600, ascends by vapor pressure, and is discharged to the funnel 300 through the other end 560. The contact portion of the water supply tube 500 with the heater 600 is preferably made of material having a good heat transfer rate to transfer the heat of the heater 600 to the water flowing therein.

In the meanwhile, at the mid portion of the water supply tube 500, a check valve 550 is provided to prevent water from flowing backward toward the water tank 200. Check valve 550 can be made in various structures. One example of the check valve having a simple structure is described in the below.

One end portion 510 of the water supply tube 500, i.e., a portion arranged closer to the water tank 200, has a comparatively small inner diameter. A portion adjacent to the heater 600 has an inner diameter slightly greater than the inner diameter of the portion arranged closer to the water tank 200. Among the portions having different inner diameters, a ball (not shown) is provided at the inside of the water supply tube 500 having the slightly large inner diameter. Here, ball is not freely movable inside a portion of the water supply tube 500 having the slightly large inner diameter, and is not movable inside a portion of the water supply tube 500 having the slightly small inner diameter to have a size capable of braking the water passage.

When the check valve 550 is made in the above construction, it prevents water from flowing backward to toward the water tank 200 in the following principle.

Water introduced into the water supply tube 500 from the water tank 200 passes through the check valve 550 and moves to the contact portion with the heater 600. At this time, since the ball is located at a lower portion by the gravity and water pressure, it does not block the water passage having the small diameter. As the heater 600 is heated, the water supply tube 500 corresponding to the contact with the heater 600 is also heated along with the water received in the water supply tube 500. As the water in the water supply tube 500 is heated, the inner pressure of the water supply tube 500 is elevated, so that the ball ascends to block the water passage of the water supply tube having the small inner diameter. Thus, if the entrance of the portion having the small inner diameter is blocked, the water heated by the heater 600 does not ascend toward the water tank 200, so that an inverse flow is prevented. If the water is further heated in a state that the inverse current is prevented, the water ascends toward the other end 560 of the water supply tube 500 that is completely opened, and is then supplied to the funnel 300. As an amount of water ascends by the water pressure and is discharged through the other end 560, the inner pressure of the water supply tube 500 is lowered and the ball descends, so that the water stored in the water tank 200 is supplied downward. While the foregoing steps are repeated, water is heated, the heated water is supplied to the funnel 300 in a state that an inverse current is prevented.

As described above, the check valve 550 having a simple structure using water pressure, gravity and vapor pressure is provided in the present invention. However, it is apparent that the present invention is restricted only to the check valve 550 constructed as above. In other words, it is possible to install a separate valve for temporarily closing the water passage of the water supply tube 500 while the water is heated and boiled.

In the meanwhile, the microwave oven according to the first embodiment of the invention may be further provided with a casing door 110 for opening/closing the opened front of the casing 100. Casing door 110 is coupled to one edge of the front of the casing 100 by a hinge 111. It is preferable that the front of the casing door 110 has a surface that is continuous with the cavity door 40 installed adjacent thereto.

Casing door 110 is provided to open/close the entire portion of the opened front of the casing door 110 such that the water tank 200, the funnel 300 and the jug 400 are received in the casing 100 completely when the casing door 110 is closed. However, since users frequently carry the jug 400 in or out of the microwave oven, it is preferable that the casing door 110 is designed to open/close the portions here the water tank 200 and the funnel 300 are positioned except for the portion where the jug 400 is positioned, as shown in FIG. 2. Accordingly, the users carry the jug 400 out of the casing 100 to enjoy drinking coffee in a state that the casing door 110 is closed.

In the meanwhile, in the first embodiment, at the opened front of the casing 100, front cover can be coupled. The front cover has an opening communicating the interior of the casing 100 with the exterior, and if necessary, a controller for operating the microwave oven and the coffee maker may be further provided. Also, if necessary, a cover door for opening/closing the opening may be further provided. The front cover constructed as above will be described in detail in the descriptions of the second and third embodiments with reference to the accompanying drawings.

Housing (not shown) is installed to enclose the frame 30 and the electronic device chamber 50, and protects the inner elements of the microwave oven.

An operation of the first embodiment constructed as above will be described below. Since the detailed description on the basic functions of heating foods using a microwave and related contents of the microwave oven is already made in the related art, their description will be omitted. Hereinafter, the description on the operation will be made focusing on the coffee maker's functions added to the microwaves oven of the present invention.

First, the funnel 300 is drawn out from the casing 100, and the filter is installed in the inner circumference of the funnel 300. A proper amount of powdered coffee is supplied on the filter and the funnel 300 is pushed in the casing 100. The jug 400 is cleanly washed and pushed in the casing 100 such that the bottom of the jug can contact with the heating plate 160. After supplying water to the water tank 200, the user operates the coffee maker coupled to the microwave oven.

Once the coffee maker is operated, the water supply tube 500 and the heating plate 160 are heated by heat generated from the heater 600. At the same time, water is supplied from the water tank 200 to the inside of the water supply tub 500. The water supplied to the water supply tube 500 drops downward and is heated by the heater 600.

If a pressure in the water supply tube 500 is increased while the water is boiling after a predetermined time, the ball obstructs the flow passage of the water supply tube 500. As a result, the boiled water rises upward due to a high steam pressure such that it is discharged to the funnel 300 through the other end 560 of the water supply tube 500. If the hot water is supplied to the funnel 300, the powdered coffee is dissolved and the liquefied coffee drops through the drop hole to the inside of the jug 400 such that it is stored in the jug 400. At this time, since the jug 400 directly contacts with the heating plate 160 heated by the heater 600, the coffee can be maintained always in a hot state.

Meanwhile, a proper amount of the hot water heated by the heater 600 is supplied to the funnel 300, a pressure of the water supply tube 500 is lowered. Therefore, the ball falls to open the flow passage of the water supply tube 500. If the flow passage of the water supply tube 500 is opened, the water contained in the water tank 200 is again supplied to portion adjacent to the heater 600. Thereafter, the supplied water is heated by the heater 600 and supplied to the funnel 300 through the other end 560 of the water supply tube 500 due to the pressure. By repeating the above procedures, the whole quantity of water contained in the water tank 200 is heated and supplied to the funnel 300. Then, the coffee is liquefied and stored in the jug 400.

Since the heating plate 160 makes the coffee stored in the jug 400 maintain a hot state, the user can always enjoy the hot coffee by pulling out the jug 400.

The first embodiment of the present invention has following advantages.

First, in addition to the microwave's basic function of heating foods using a microwave, it is possible to conveniently make the coffee that modern persons enjoy.

Second, since the coffee maker is provided at the electronic device chamber having a relative margin of space, only if the electrical elements are densely installed in the electronic device chamber, it is unnecessary to scale down the space of the cavity or increase an entire size of the microwave oven. As a result, space utility of kitchen can be improved.

Second Embodiment

Second embodiment of the present invention provides a microwave oven having a structure in which the water tank and the funnel are made in a single body in order to enhance a practical use of the space, and the structures of various parts related with the water supply and the dropping of the coffee are improved. coffee maker installed in an electronic device chamber. In addition, in the jug, various structures in which egg is boiled or tea soaks out are provided. Since the structural features of the second embodiment of the invention are well shown in FIGS. 5 to 12, the structure of the second embodiment will be described with reference to such the drawings.

As shown in FIG. 5, a microwave oven according to the second embodiment of the present invention includes a cavity 20, a cavity door 40, an electron device chamber 50, a casing 100, a water supply tube 500, a water tank 200 and a funnel 300 made in a single body, a jug 400, a heater 600 and a housing 60.

Cavity 20 is formed within a frame 30, and an opened front. Cavity door 40 is provided to opening/close the opened front of the cavity 20. Electronic device chamber 50 is provided at a side portion of the cavity 20, and is provided therein with a plurality of electrical elements including a magnetron 51, a transformer 52, a blower 53 and a motor (not shown) are installed.

Casing 100 is provided at a front side of the interior of the electronic device chamber 50. Water tank 200, funnel 300 and jug 400 are provided to enter and go out of the interior of the casing by pushing and pulling. Heater 600 is provided at a lower portion of the casing 100. Water supply tube 500 is provided such that one end there is connected with the water tank 200, the other end 560 is arranged over the funnel 300, and a part is in contact with the heater 600. Housing 60 covers the frame 30 and the electronic device chamber 50 to protect the inner elements of the microwave oven.

Here, the basic constitution of the microwave oven including the cavity 20 and the electronic device chamber 50, and the elements of the coffee maker including the casing 100, the water supply tube 500, the heater 600 and the heating plate are described in detail in the first embodiment made with reference to FIGS. 2 to 4. Hence, their detail description is omitted herein. Only, elements of the second embodiment that different than those of the first embodiment or are newly added will be concentratively described.

Front cover 130 is attached to the opened front of the casing 100. Front cover 130 has an opening the interior of the casing 100 with the exterior as shown in FIG. 5. Hence, users takes out the jug 400 and the water tank 200 through the opening and puts them into the interior of the casing 100. At the front cover 130, a controller button for controlling the microwave oven and the coffee maker can be provided. The front of the front cover 130 provided as above has a surface that is continuous with the front of the cavity door 40 in order to enhance a sense of beauty.

Figure 6:
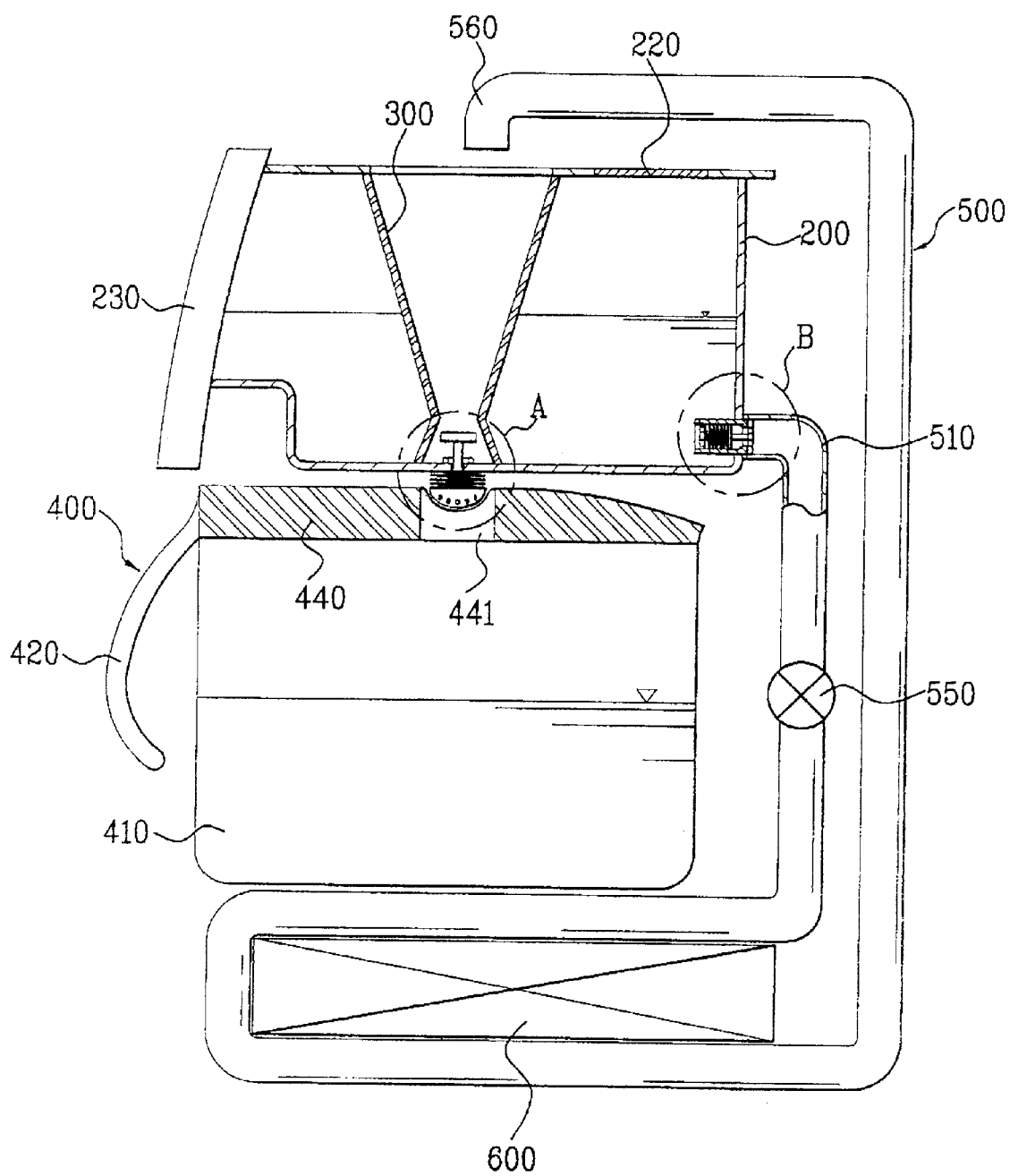
FIG. 6 is a partial side sectional view showing the structure of a microwave oven according to a second embodiment of the present invention.

One of technical features of the second embodiment is that the water tank 200 and the funnel 300 are made in a single body as shown in FIGS. 5 and 6, and will be described below in detail.

Water tank 200 has therein a water storage space, and at an approximate upper portion, for instance, at a portion of the upper surface, has an entrance communicating the exterior with the interior so that water can be supplied from the exterior. Water tank cover 220 is provided to open/close the entrance of the water tank 200. Funnel 300 is, as shown in FIGS. 5 and 6, shaped in a concave cone of which the upper diameter is greater than the lower diameter as it travels from the upper center of the water tank 200 to the bottom surface, and constitutes an outer circumferential surface of the water tank 200. If the funnel 300 is constructed as above, it becomes possible to provide a coffee maker with a more compact structure than that of the first embodiment in which each of the water tank 200 and the funnel 300 has their spaces at the upper and lower portions. At an inner circumferential surface of the funnel 300 corresponding to an outer circumferential surface of the water tank shaped in a concave cone, filter is installed and powder coffee is supplied into the filter. The front 230 of the water tank 200 has a continuous surface with the front cover 130.

In the meanwhile, as shown in FIG. 6, the other end 560 of the water supply tube 500 supplying hot water heated by the heater 600 to the funnel 300 is arranged such that when the water tank 200 is completely received in the casing 100, it is positioned over the funnel 300.

Figure 7:
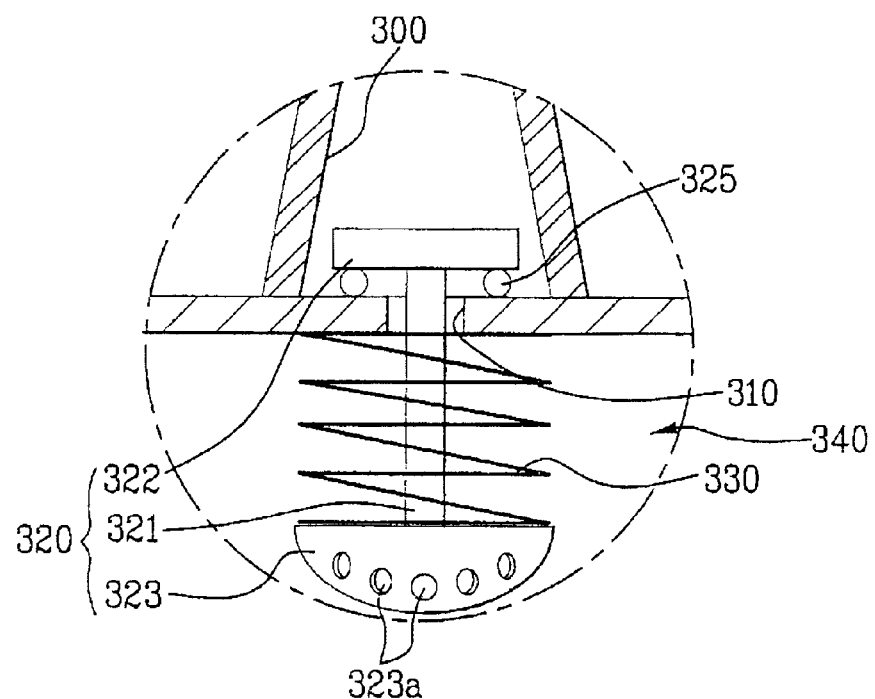
FIG. 7 is a partially enlarged view of the "A" portion of FIG. 6.

In the second embodiment, the container is comprises of the jug 400. As shown in FIGS. 6 and 7, the funnel 300 further includes a coffee discharge valve 340 controlling the flow passage of the drop hole 310 such that the liquid coffee contained in the funnel 300 is dropped downward only when the jug 400 is received in the casing 100.

Coffee discharge valve 340 that is closing the flow passage of the drop hole 310 formed below the funnel 700 opens the drop hole 310 when the jug 400 is received within the casing 100 and is pushed by an upper portion of the jug 400. Coffee discharge valve 340, as shown in FIG. 7, includes an opening/closing member for directly opening/closing the drop hole 310, and a spring 330 providing elastic force to the opening/closing member 320.

Opening/closing member 320 includes a stick 321, a second end portion 323 and a first end portion 322. Here, the stick 321 is provided to penetrate the drop hole 310 formed below the funnel 300 and be movable up and down. Second end portion 323 is widely formed at one end, for instance, at the lower end of the stick 321, and is pushed up by contacting with the upper surface of the jug 400 when the jug 400 is received in the casing 400. First end portion 322 is widely formed at the other end of the stick 321, for instance at the upper side of the stick 321, and opens the drop hole 310 when the second end portion 322 is pushed up by the jug 400 in a state that the first end portion 321 closes the drop hole 310.

In the meanwhile, the second end portion 323 of the opening/closing member 320 is, as shown in FIG. 6, ascends with contacting with the upper surface of the jug 400. When the jug 400 is inserted into the casing 100, the second end portion 323 slidingly contacts with the upper surface of the jug 400. To decrease the friction in the sliding contact, the second end portion 323 has a bowl shape of which the lower surface is convex downwardly. In case the second end portion 323 is made in a bowl shape, the coffee dropped downward through the drop hole 310 may stay in the upper surface of the second end portion 323. In order to prevent the coffee from staying in the upper surface of the second end portion 323, a plurality of holes 323a for dropping the coffee staying in the upper surface of the second end portion 323 to the interior of the jug 400 are penetratedly formed as shown in FIG. 7.

Spring 330 is provided between the opening/closing member 320 and the funnel 300. In more concrete, the spring 330 is comprised of a conventional compression spring which accumulates an elastic energy when it is subject to a compressive force in the length direction and then is restored when the compressive force is deleted. As shown in FIG. 7, the spring 330 is provided such that the other end thereof is in contact with the lower surface of the funnel 300 and fixed thereto. The spring 330 always provides a force pushing the second end portion 323 in the downward direction. Hence, a part of the opening/closing member 320, in more detail, the first end portion 322 closes the drop hole 310 while it always maintains a close contact state with the drop hole 310 by the force of the spring 330.

An operation of the spring 330 is reviewed in brief. When the jug 400 is received in the casing 100, if the second end portion 323 is in contact with the upper surface of the hug 400 and is pushed up, the first end portion 322 ascends along with the second end portion 323 to open the drop hole 310. At this time, the spring 330 is compressed to accumulate the elastic energy. On the contrary, when the jug 400 is taken out of the casing 100 in a state that it is received in the casing 100, the force pushing the second end portion 323 disappears, so that the spring 330 is restored to the original state. As a result, the second end portion 323 descends along with the first end portion 322 to close the drop hole 310.

In the coffee discharge valve 340 having the aforementioned operation, the spring 330 is not restricted to the coil type compressive spring. In other words, the spring 330 would be enough if it is arranged between the opening/closing member 320 and the funnel 300 to provide the force pressing the spring 330 in the downward direction. As another embodiment of the spring 330, there is a plate spring which has both ends fixed to the second end portion 323 and the lower surface of the funnel 300 respectively, accumulates an elastic energy by being deformed when the second end portion 323 ascends, and is restored when the external force applied to the second end portion 323 is removed, to descend the second end portion 323.

In the meanwhile, the coffee discharge valve 340 of the second embodiment of the present invention further includes an O-shaped ring 325 as shown in FIG. 7. Here, the O-shaped ring 325 is provided between the first end portion 322 and the lower surface of the funnel 300 at which the drop hole 310 is formed, and functions to prevent water leakage by enhancing the airtightness when the first end portion 322 closely contacts with and closes the drop hole 310.

In the second embodiment, a water supply valve 250 is provided. The water supply valve is pressed by one end 510 of the water supply tube 500 when the jug 400 is completely inserted into the casing 100 and is opened to supply water to the water supply tube, while when the jug 400 is taken out of the casing 100, it is closed to prevent the water stored in the water tank 200 from being leaked to the exterior. Hereinafter, a structure of the water supply valve 250 will be described in detail with reference to FIGS. 7 and 8.

The water supply valve 250 includes a valve body 251, a flow passage control plate 252 and a valve spring.

Figure 8:
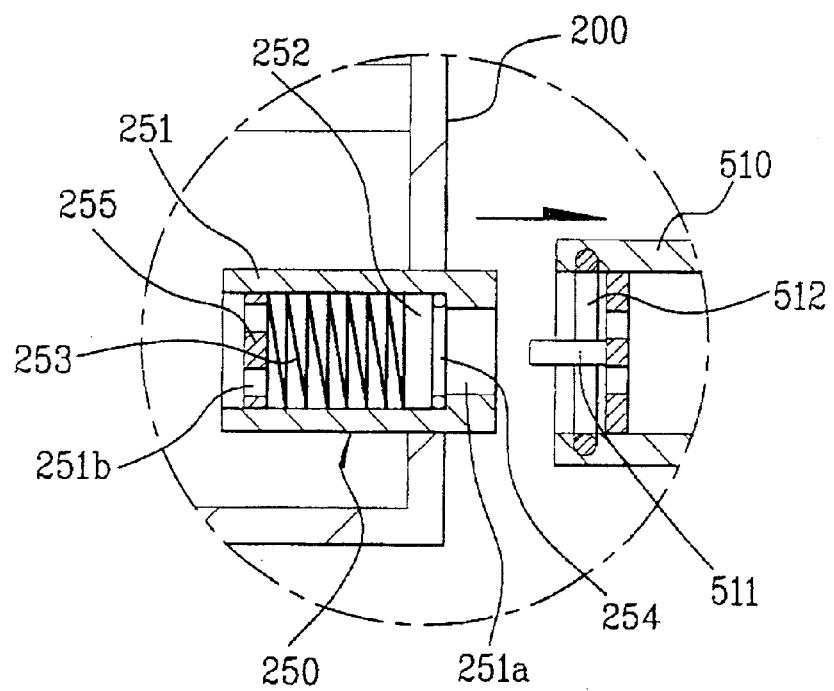
FIG. 8 is a partially enlarged view of the "B" portion of FIG. 6.

The valve body 251 has therein a space, and also has an inlet 251b through which the water of the water tank 200 is introduced and an outlet 251a through which the water is drained. This valve body 251 is provided to penetrate one side of the water tank 200, in more detail, the lower surface of the water tank 200 or the lower side portion of the water tank 200 such that the inlet 151b is located inside the water tank 200 and the outlet 251a is located outside the water tank 200. FIG. 8 shows an example that the valve body 251 is made in a pipe structure. In FIG. 8, the outlet 251a is formed at the opened end of the valve body 251 and has a diameter smaller than the inner diameter of the valve body 251. The inlet 251b is formed to penetrate a supporting plate 255 inserted in the opened other end 560 of the valve body 251. However, the valve body 251 is not restricted only to the pipe structure of which both ends are opened as shown in FIG. 8. For instance, in the valve body 251 of FIG. 8, while the one end located within the water tank 200 is completely closed, an inlet may be formed on the circumferential surface of the valve body 251 in the diameter direction.

The flow passage control plate 252 is inserted into an inner space of the valve body 251 such that it is movable along the inner space of the valve body 251. It is desirable that the flow passage control plate 252 has the same outer diameter as the inner diameter of the valve body 251. The flow passage control plate 252 that is in a state that the flow passage control plate 252 is in contact with the outlet 251a to block the outlet 251a, is pressed by one end 510 of the water supply tube 500 to open the outlet 251a. This flow passage control plate 252 has a plurality of passing holes (not shown) through which water passes in case where the inlet 251b is formed to penetrate the supporting plate 255 as shown in FIG. 8. In more detail, the plurality of passing holes are formed along the edge portion of the flow passage control plate 252. Then, the passing holes are closed when the flow passage control plate 252 is closely in contact with the outlet 251a, while they are opened to pass the water therethrough when the flow passage control plate 252 is spaced apart from the outlet 251a. This structure is not shown in the drawings because whoever read the above description can analogize such a structure with ease. Meanwhile, in case the inlet 251b is formed on the circumferential surface of the valve body 251 in the diameter direction, the flow passage control plate 252 has no need to have the passing holes. In other words, in case the flow passage control plate 252 is closely in contact with the outlet 251a, the outlet 251a is closed, so that the water is not discharged. However, if the flow passage control plate 252 is moved backward from the inlet formed on the circumferential surface of the valve body 251 in the diameter direction, the inlet communicates with the outlet 251a, so that the water stored in the water tank 200 is discharged to the exterior. This structure is also not shown in the drawings because whoever read the above description can analogize such a structure with ease.

The valve spring 253 is inserted into an inner space of the valve body 251 to provide an elastic force permitting the flow passage control plate 252 to be closely in contact with the outlet 251a side. In more detail, one end of the valve spring 253 is supported by the supporting plate 255 or fixed to one side of the valve body 251, while the other end of the valve spring 253 is fixed to the flow passage control plate 252. The valve spring 253 installed as above provides a force always pushing the flow passage control plate 252 toward the outlet 251a side. As the valve spring 253 is pressed by one end 510 of the water supply tube 500 and moved backward to be subject to a compressive force, it accumulates an elastic energy and then restores the flow passage control plate 252 to the original position by the accumulated elastic restoring force. The valve spring 253 can be made in various shapes including the coil type compressive spring shown in FIG. 8.

The water supply valve 250 constructed as above further includes an O-shaped ring 524 to prevent water leakage by enhancing the airtightness when the flow passage control plate 252 is closely in contact with the outlet 251a of the valve body 251. The O-shaped ring 524 is provided on the inner circumferential surface located between the outlet 251a and the flow passage control plate 252.

Meanwhile, the second embodiment provides a pressing pin 511 formed at one end of the water supply tube 500 so as to effectively operate the water supply valve 250 of the water tank 200. The pressing pin 511 extends from one end 510 of the water supply tube 500 as shown in FIG. 8, and when the water tank 200 is mounted in the casing 100, it functions to press the flow passage control plate 252 of the water supply valve 250 and open the outlet 251a of the valve body 251. When the outlet 251a of the water supply valve 250 is opened, the valve body 251 of the water supply valve 250 is completely inserted into one end 510 of the water supply tube 500 such that water is leaked between the valve body 251 of the water supply valve 250 and one end 510 of the water supply tube 500. For this purpose, one end 510 of the water supply tube 500 has an outer diameter that is the same as or is slightly greater than the outer diameter of the valve body 251. In order to enhance the airtightness when the valve body 251 is inserted into the one end 510 of the water supply tube 500, an O-shaped ring 512 is further provided on the inner circumferential surface of the one end of the water supply valve 500. If the O-shaped ring 512 is provided as above, when the valve body 251 is inserted into the one end 510 of the water supply tube 500, the outer circumferential surface of the valve body 251 is inserted into the inner circumferential surface, so that the airtightness is further enhanced to prevent water leakage.

In the second embodiment, a check valve 550 for preventing occurrence of inverse current of water within the water supply valve 250, and a heating plate for effectively heating the jug 400 are further provided. Their detailed description is omitted since it was made in the description of the first embodiment.

Meanwhile, the second embodiment of the invention provides the jug 400 having various functions in which egg is boiled and tea soaks out. Hereinafter, various embodiments of the jug 400 will be described with reference to FIGS. 9 to 12.

The jug 400 includes a jug body 410 and a handgrip 420. The jug body 410 has therein a coffee storage space and is made in a structure of which the upper side is opened. The jug body 410 is preferably made of transparent glass or plastic so that the amount of the coffee stored therein can be recognized with ease. Of course, it is also allowed that the jug body 410 is made an opaque material.

The handgrip 420 extends from one side of the jug body 410 such that it is held by a hand with ease from the exterior.

In the second embodiment of the invention, the jug further includes a rim reinforcing member 430 and a jug cover 440 as shown in FIGS. 9 to 12. The rim reinforcing member 430 is provided to enclose the inner and outer circumferences of the opened upper side of the jug body 410. The jug cover 440 is provided to open and close the opened upper side of the jug body 410. Here, the jug cover 440 can be made in a completely separated body as shown in FIGS. 9 to 12. Also, although not shown in the drawings, the jug cover 440 can be made in a structure in which one side thereof is rotatably coupled to the rim reinforcing member 430 or the jug body by a hinge (not shown) or is rotatably and separatably coupled around the hinge. Meanwhile, the jug cover has an introducing hole 441 penetratedly formed such that the coffee dropping from the drop hole 310 of the funnel 300 passes through.

In the second embodiment of the invention, the jug 400 has the basic constitution described as above, and may have various structures so as to perform additive functions for boiling egg or boiling tea. Various embodiments related with these additive functions for the jug 400 will be described.

Figure 9:
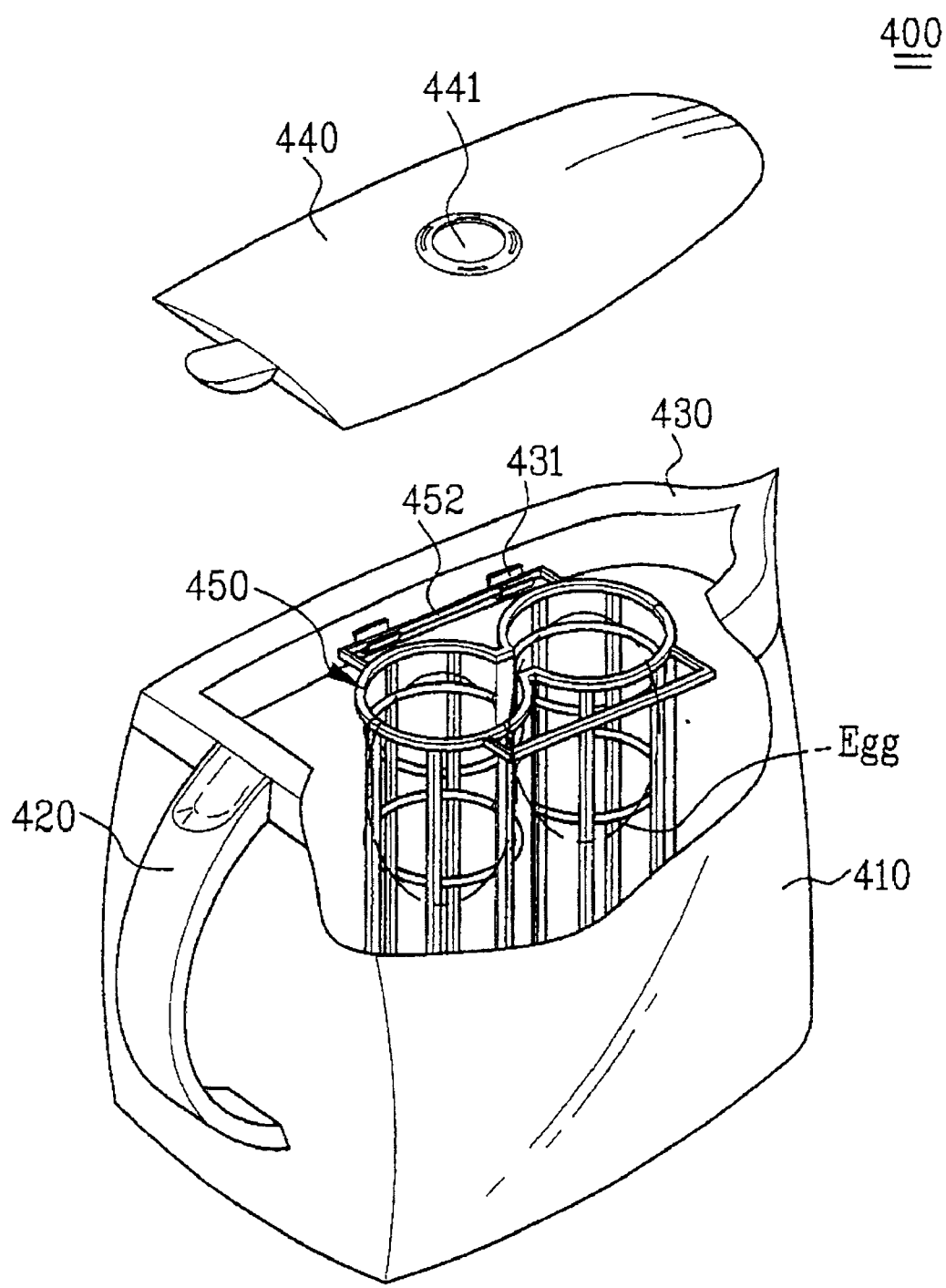
FIG. 9 is a partially cutout perspective view showing an embodiment of the jug.

One example of the jug 400 shown in FIG. 9 further includes a hanger 431 and an egg poacher 450.

The hanger 431 extends in a hook shape from the rim reinforcing member 430 toward the interior of the jug body 410 so as to fix and hang an object.

The egg poacher 450 is woven in a net shape to accommodate therein at least one egg, and is fixed within the jug body 410 by inserting a part of the egg poacher 450 onto the hanger 431. Hereafter, detailed construction of the egg poacher 450 will be described.

The egg poacher 450 includes a first member 460 and a second member 470. The first member 460 includes vertical members 453 and horizontal members 454 woven like a net.

The first member 460 and the second member 470 are rotatably coupled by a hinge 451. At one edge of the first member 460 and one edge of the second member 470, for instance, at opposite sides of the hinge 451, a hook 461 and a hook holder 471 are respectively provided. The hook 461 is protruded from the first member 460, and the hook holder 471 extends from the second member 470. When the first member 460 and the second member 470 are folded and coupled to each other, the hook 461 is coupled and fixed to the hook holder 471, so that the first member 460 and the second member 470 are fixed in a coupled state to each other.

Figure 10:
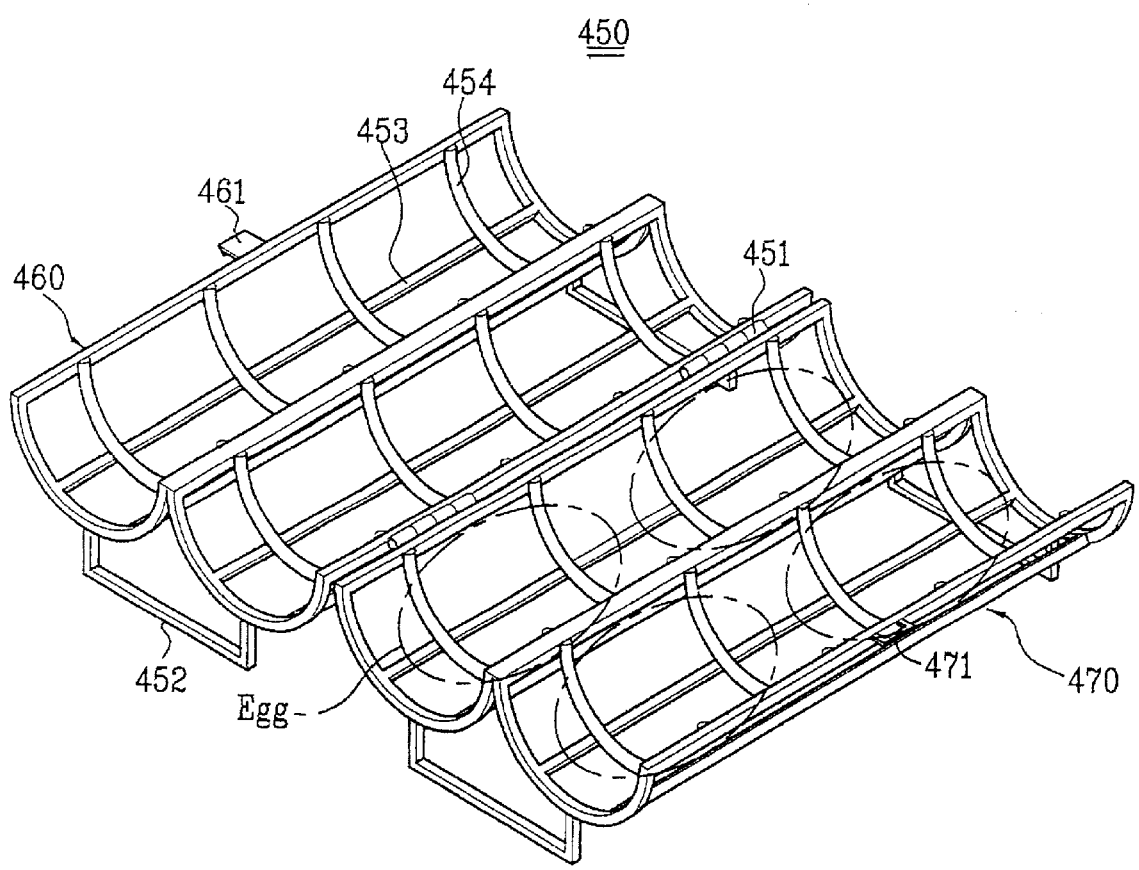
FIG. 10 is a perspective view showing an embodiment of the egg poacher.
Figure 11:
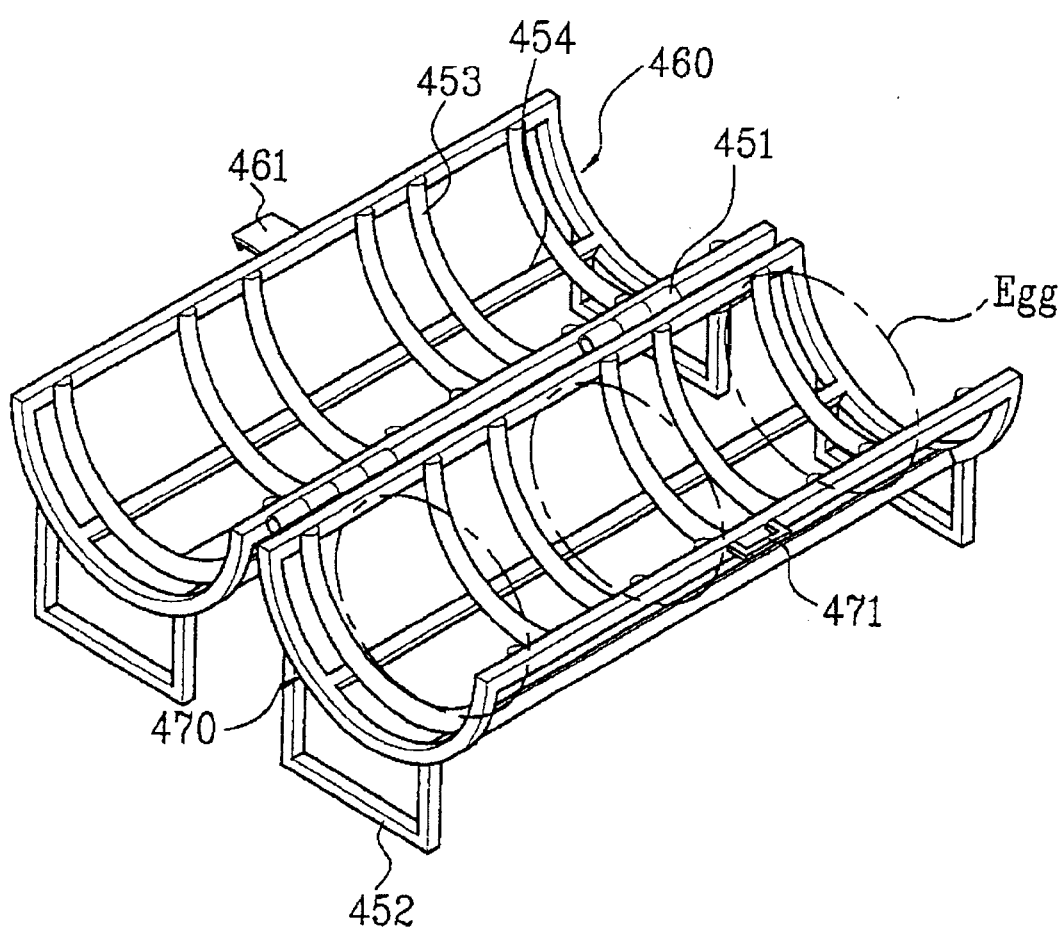
FIG. 11 a perspective view showing another embodiment of the egg poacher.

The first member 460 and the second member 470, as shown in FIGS. 10 and 11, have a concave curved surface for accommodating approximate half of an outer circumferential surface of eggs. Hence, as shown in FIG. 9, if the first member 460 and the second member 470 are coupled to each other, it is allowed to accommodate the eggs in the inner space formed by the concave curved surfaces. The respective concave curved surfaces formed in the first member 460 and the second member 470 are arranged in a kind of a long semicircular channel configuration. The concave curved surfaces can be made in two columns as shown in FIG. 10, or in one column as shown in FIG. 11.

In the first member 460 and the second member 470 constructed as above, the horizontal member 453 is protruded inwardly from the concave curved surface to support both sides of the eggs mounted in the egg poacher 450. If the horizontal member 453 is protruded inwardly from the concave curved surface to support both sides of the eggs, it is prevented that the eggs received in the egg poacher 450 from being moved. The horizontal members 453 may be arranged at a wide interval as shown in FIG. 10 so as to support both sides of the egg in the length direction, or may be arranged at a narrow interval as shown in FIG. 11 so as to support both sides of the egg in the width direction. The protruded height of the horizontal members 453 arranged as above becomes different depending on the position where the eggs are supported. Also, the accommodating direction of the eggs should be determined considering the sizes of the casing 100 and the jug 400. After the accommodating direction of the eggs is determined, the curvature of the concave curved surface, the number of the columns, and the disposal interval of the horizontal members 453 are determined too.

As shown in FIGS. 9 to 11, at an end portion of the first member 460 or an end portion of the second member 470, at least one fixing piece 452 is extended. The extended fixing piece 452 is inserted into the hanger 431 shown in FIG. 9 and fixed to in a state that the egg poacher 450 is arranged inside the jug body 410.

Figure 12:
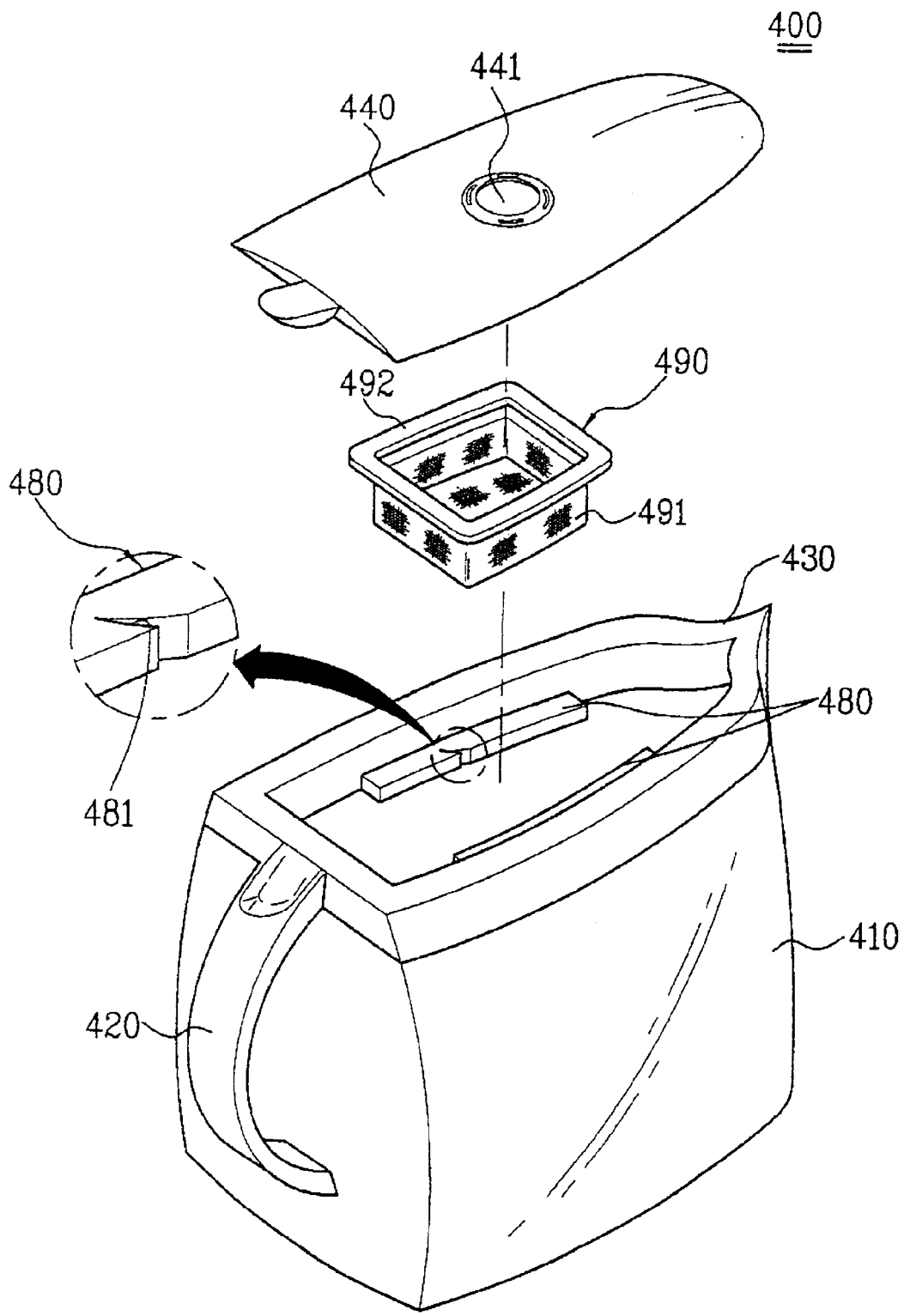
FIG. 12 is a disassembled perspective view showing another embodiment of the jug.

FIG. 12 shows another embodiment of the jug 400. Referring to FIG. 12, the jug 400 further includes a rack 480 and a tea strainer 490.

The rack 480 includes a plurality of racks, preferably a pair of racks as shown in FIG. 12. The pair of racks are horizontally protruded from the rim reinforcing member 430 toward the interior of the jug body 410. Also, the tea strainer 490 is provided such that tea leaf, tea powder or the like is received, one end is fixed in a state that one end thereof is hung and supported, and a part thereof is dipped in the water contained in the jug body 410. The tea strainer 490 includes a mesh 490 and a flange. Here, the mesh 491 is, as shown in FIG. 12, shaped in a container of which the upper side is opened so as to have therein a space for accommodating tea. The flange 492 is widely extended along the opened upper circumference of the mesh 491.

Meanwhile, in another example of the jug 400, there is provided a structure in which tea is boiled using a disposable tea bag. For this purpose, as shown in FIG. 12, a slit (not shown) or a fixing groove 481 is provided. The slit is formed by cutting out the rack 480 inwardly from an outer circumferential surface off the rack 480, and the fixing groove 481 is cut out in a wedge shape inwardly from an outer circumferential surface of the rack 480. In the slit or the fixing groove 481 formed as above, since a string connected to a tea bag or a tea infuser is inserted or fixed thereto, users can boil the tea conveniently.

In the second embodiment of the invention having the foregoing construction, the coffee maker operates as follows.

First, the water tank 200 made in a single body together with the funnel 300 is taken out of the casing 100 to supply water therein. Then, the water tank 200 is received in the casing 100. The lower surface of the water tank 200 received in the casing 10 is supported by the bracket 120. After the water tank containing water is completely received in the casing 100, the coffee maker is operated by manipulating the controller.

If the water tank 200 is completely received in the casing 100, the pressing pin 511 located at one end of the water supply tube 500 presses the flow passage control plate 252 of the water supply valve 250 to move the flow passage control plate backward, so that the outlet 251a is opened. If the outlet 251a is opened, the water stored in the water tank 200 is introduced into the valve body 251 through the inlet 251b and is supplied to the water supply tube 500 through the outlet 251a. The water introduced into the water supply tube 500 is heated while passing through the contact portion located at the lower portion of the casing 100 with the heater 600. If the water is heated, as described in the first embodiment, an inverse current of the water is prevented by the check valve 550. The hot water having a high pressure by heating is supplied to the funnel through the other end of the water supply tube 500.

Meanwhile, the jug 400 is washed cleanly and mounted on the heating plate of the casing 100. As the jug 400 is received in the casing 100, the second end portion 323 of the coffee discharge valve 340 is in contact with the upper surface of the jug cover 440 and ascends, so that the drop hole 310 is opened. If the drop hole 310 is opened, the liquid coffee created within the funnel 300 is dropped downward through the drop hole 310. The dropped coffee penetrates the introducing hole 441 of the jug cover 440 and is then received in the jug body 410. Since the hot liquid coffee received in the jug body 410 continues to be supplied with heat through the heating plate, it is always maintained at a hot state.

Meanwhile, if the water tank 200 is taken out of the casing 100, the flow passage control plate 252 of the water supply valve 250 blocks the outlet 251a, so that water is not supplied to the water supply tube 500. Also, if the jug 400 is taken out of the casing 100, the opening/closing member 320 of the coffee discharge valve 340 descends to close the drop hole 310, so that the liquid coffee in the funnel 300 is not dropped in the jug 400.

The second embodiment of the invention makes the coffee through the aforementioned procedure. Hereinafter, an operation of when using additive functions using the various embodiments of the jug 400 will be described.

First, in case that an egg is boiled using the second embodiment of the present invention, an example of the jug 400 shown in FIGS. 9 to 11 is used. The egg poacher 450 is unfolded as shown in FIGS. 10 and 11. A predetermined number of eggs are arranged on the concave curved surface of the first member 460 or the second member 470, and any one of the first and second members 460 and 470 is rotated around the hinge 451. Then, the hook is hanged on the hook holder 471 and fixed. The egg poacher 450 accommodating the eggs is fixed within the jug body 410, as shown in FIG. 9. In that case, the fixing piece 452 is inserted into the hanger 431 to fix the egg poacher.

If the egg poacher 450 accommodating the eggs is received within the jug body 410, the water tank 200 is supplied with water and received within the casing 100, and then the coffee maker is operated. The water is heated by the heater 600 while flowing through the water supply tube 500, and the heated hot water flows through the funnel 300 and is stored in the jug body 410. The hot water is supplied to the interior of the jug body 410 up to a predetermined level and the eggs are boiled after a predetermined time.

If the eggs are boiled, the egg poacher 450 is pulled out from the jug body 410, and the hook 461 is separated from the hook holder 471. After unfolding the egg poacher 450, the eggs are taken out and cooked.

Meanwhile, in case that a tea is made using the second embodiment of the present invention, another example of the jug 400 shown in FIG. 12 is used. First, the tea strainer 490 is used when making powdered or leaf tea. A predetermined small amount of powdered or leaf tea is supplied inside the mesh 491 of the tea strainer 490. The tea strainer 490 is received in the jug body 410 so that the flange 492 is fixed and supported to the upper portion of the rack 480.

After the jug 400 in which the tea strainer 490 is mounted receives within the casing 100, the water tank 200 containing water is received within the casing 100. If the coffee maker is operated, the heated water drops to the tea strainer 490 through the water supply tube 500 and the funnel 300. At this time, the hot water becomes liquidus tea while flowing through the tea strainer 490. Meanwhile, if a water level of the liquidus tea stored in the jug body 410 is increased, the powdered or leaf tea stored in the tea strainer 490 is dipped into liquidus tea, thereby being stronger.

As described above, since the liquidus tea which is stored in the jug body 410 is heated by the heater, such that the tea is always maintained in a hot state. Therefore, the user can enjoy the hot tea by pulling out the jug 400.

Meanwhile, in case that a tea is made using a tea bag or a tea infuser, a string of the tea bag or the tea infuser is fixedly inserted into a slit or a fixing groove 481 which is formed on the rack 480 and then the coffee maker is operated. Since ingredients of tea contained in the tea bag or the tea infuser are dissolved in water while the hot water is being stored in the jug body 410, the hot liquidus tea can be made. After tea soaks out during a predetermined time, the string fixed to the slit or the fixing groove 481 is released and the tea bag or the tea infuser is pulled out from the jug body 410.

The above second embodiment of the present invention has following advantages.

First, since the funnel and the water tank are formed in a single body, the coffee maker can become compact compared with the related art. If the coffee maker becomes compact, the design becomes more convenient since wide space of the electronic device chamber of the microwave oven can be secured.

Second, except for making the coffee, eggs or teas can be boiled or made using various modified embodiments of the jug. Since the second embodiment of the present invention provides various additional functions as well as the basic function of the microwave oven, the microwave oven can be utilized very conveniently and usefully.

Third Embodiment

In a third embodiment of the present invention, there is provided a structure which filtered coffee dropping from a funnel is stored in a plurality of cups.

Figure 14:
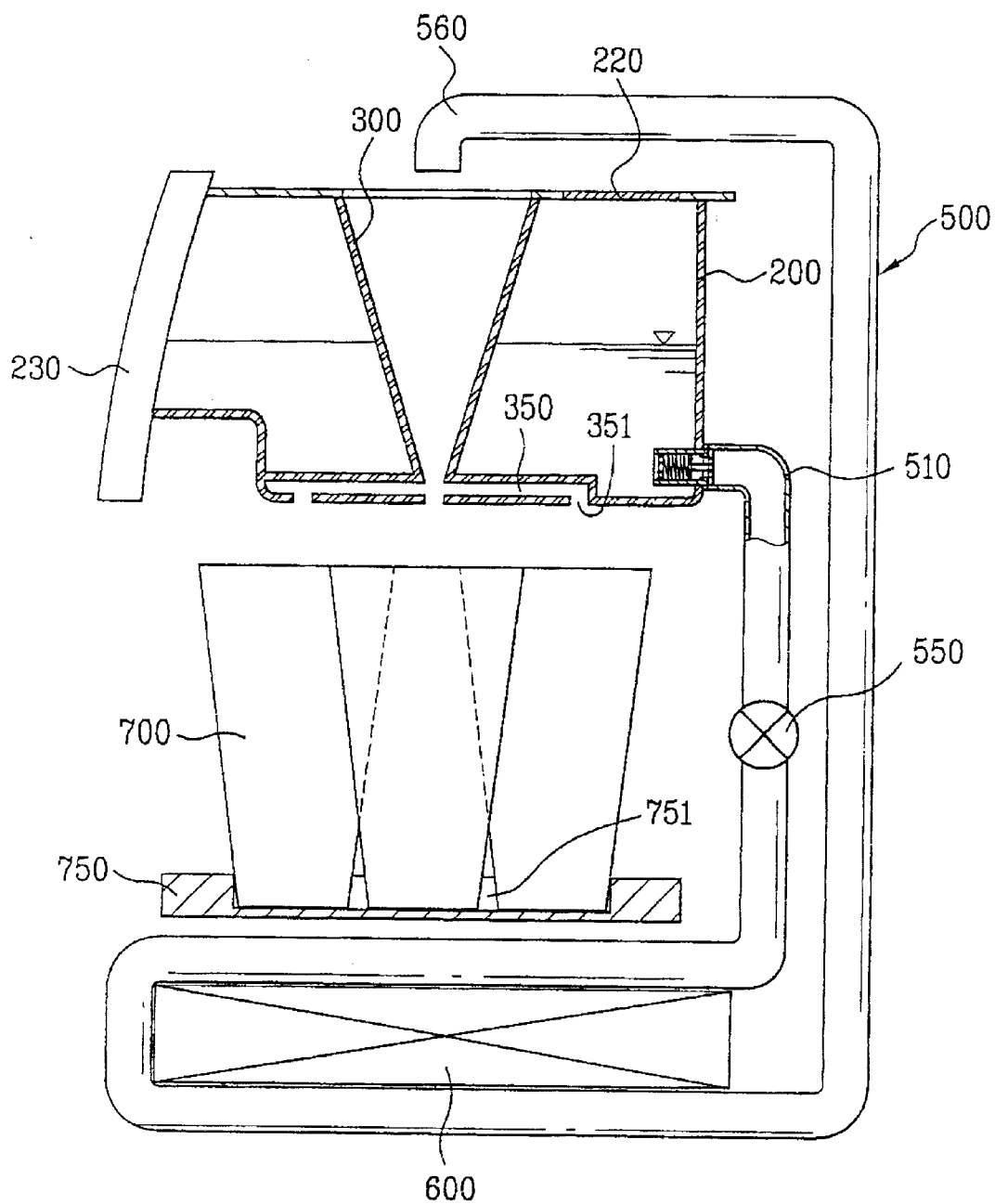
FIG. 14 is a partial side sectional view showing the structure of a third embodiment of the present invention.
Figure 15:
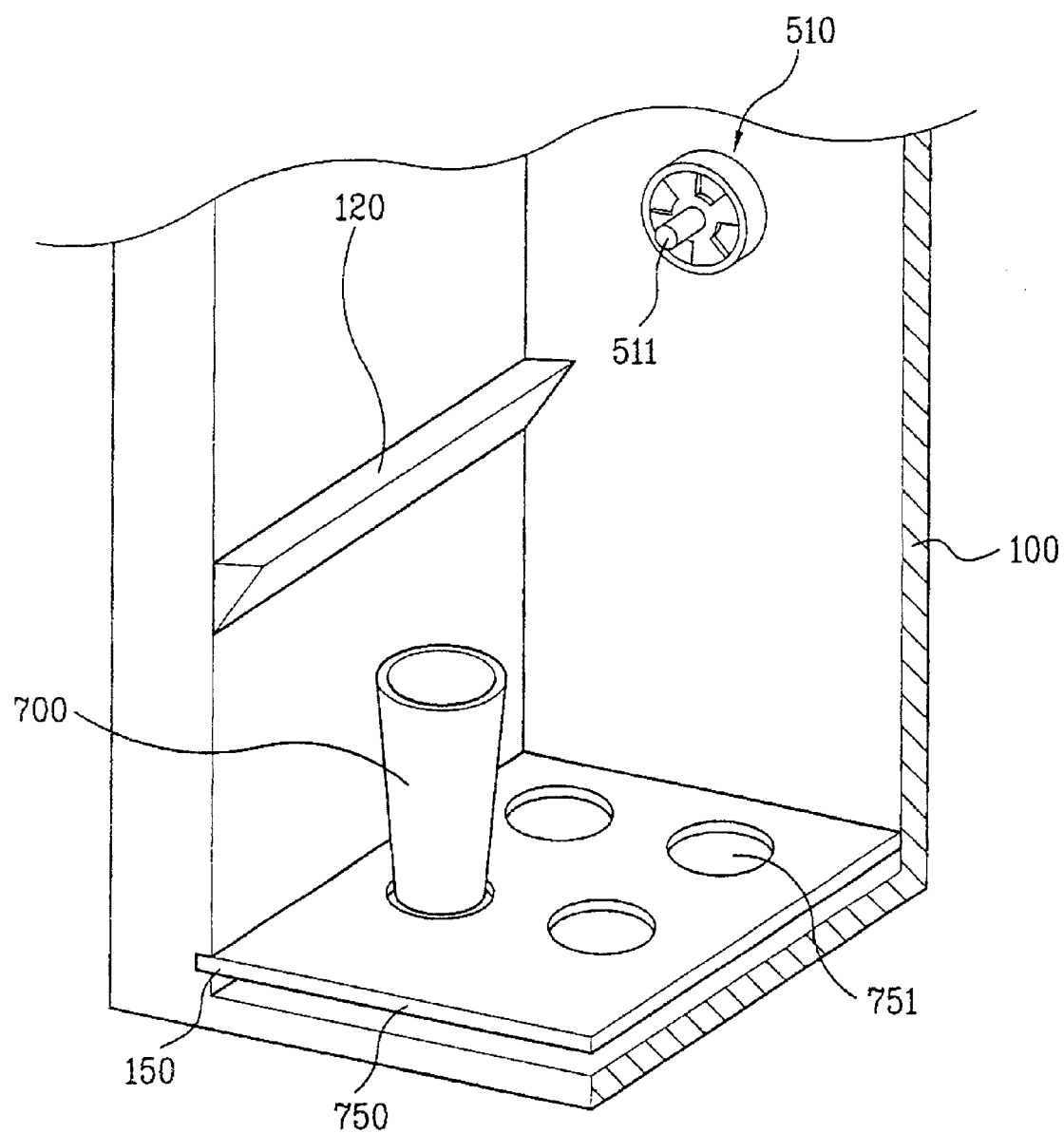
FIG. 15 is a partial perspective view showing that the casing is partially cutout in a third embodiment of the present invention.

The structural characteristic of the third embodiment is well illustrated in FIGS. 13 to 15. The structure of the third embodiment will be described in detail with reference to the drawings.

Referring to FIG. 13, the third embodiment includes a cavity 20, a cavity door 40, an electronic device chamber 50, a casing 100, a water supply tube 500, a water tank 200 and a funnel 300 formed in a single body, a plurality of cups 700, a heater 600, and a housing 60.

The cavity 20 installed in an interior of a frame 30 has an opened front and the cavity door 40 opens/closes the opened front of the cavity 20. Electronic device chamber 50 is arranged adjacent to the cavity 2, and is provided therein with electrical elements including the magnetron 51, the transformer 52, and the blower 53. The casing is provided at a front side of the interior of the electronic device chamber 50, and the water tank 200 and the funnel 300 as well as a jug 400 are provided with the casing so that they can enter and go out of the interior of the casing 100. The heater 600 is provided in a lower portion of the casing 100. The water supply tube 500 has one end 510 connected with the water tank 200 and the other end 560 arranged at an upper portion of the funnel 300. A portion of the water supply tube 500 contacts with the heater 600. The housing 60 encloses the frame 30 and the electronic device chamber 50 so as to protect the elements of the microwave oven.

In the first and second embodiments, detailed description are made on the basic elements constituting the microwave oven, including the cavity 20 and the electronic device chamber 50, and elements constituting the coffee maker, including the casing 100, the water supply tube 500, the heater 600 and the heating plate. Therefore, their detailed description will be omitted herein. Hereinafter, the detailed structure of the third embodiment will be described focusing on the elements different from the first embodiment or newly added elements.

A front cover 130 is attached to the opened front of the casing 100. As shown in FIG. 13, the front cover 130 has an opening which communicates an interior of the casing 100 with the outside of the casing 100. A cover door 140 is provided to completely or partially open/close the opening of the front cover 130. Here, it is desired that a portion of the opening can be opened/closed so as not to externally expose the plurality of cups 700 deposited on a lower portion of the water tank 200 when the cover door 140 is closed. The front cover 130 provided as above has a surface that is continuous with the cavity door 40, and it is desired that the cover door have a surface that is continuous with the front cover 130.

Meanwhile, in the third embodiment, the funnel 300 and the water tank 200 are formed in a single body. A water supply valve 250 is provided at one end of the water tank 200. Since the detailed description on the structure is already made, its description will be omitted. At this time, unlike the second embodiment, the coffee discharge valve is not provided in the third embodiment. Instead, as shown in FIG. 14, there are provided a plurality of coffee flow passages 350 through which the coffee filtered in the funnel flows, and a plurality of coffee discharge holes 351 through which the coffee is discharged in the downward direction. These coffee flow passages 350 are provided at the lower portion the funnel 300 so that the coffee can flow inwardly. The plurality discharge holes 351 passing through the lower portion of the funnel 300 are provided so as to communicate the coffee flow passages 350 with the outside. Like this, if the coffee flow passages 350 and the coffee discharge holes 351 are provided at the lower portion of the funnel 300, the coffee filtered in the funnel 300 flows along the coffee flow passages 350 and drops from the respective coffee discharge holes 351 in the downward direction, resulting in the dropping of coffee at a plurality of positions.

In the third embodiment, the plurality of cups 700 are provided as a container for receiving and storing the coffee dropping at the plurality of positions disposed at the lower portion of the funnel 300.

The cups 700 used in the third embodiment can be one-time cups or any general cups that are washed and used. In case of one-time cups, persons can enjoy coffee outside home or office.

In addition, as shown in FIGS. 13 to 15, the third embodiment provides a cup holder 750 in which the lower portion of the cups 700 are placed at accurate positions at which the coffee drops. The cup holder 750 is formed in a board shape and has a plurality of standing grooves 751 provided in the upper portion of the cup holder 750 such that the lower portions of the cups are inserted and supported. These standing grooves 751 are formed on positions in which the coffee dropping from the funnel 300 can be received when the cup holder 750 are completely inserted into the casing 100. Meanwhile, although not shown, standing holes can be provided instead of the standing grooves 751. The standing holes are formed to penetrate the cup holder 750 at the same positions as the standing grooves 751 in upward and downward directions. In case of the standing holes, the cups 700 can be inserted and supported at the inside of the standing holes such that the cups 700 are placed more stably. Since anyone can infer the standing holes through only the above description, description on the standing holes will be omitted.

As described above, the cup holder 750 is provided so that it can enter and go out of an interior of the casing 100. The casing 100 further includes a guide groove 150 for guiding the entering and going out of the cup holder 750. As shown in FIGS. 13 to 15, the guide groove 150 is concavely formed on both inner surfaces of the casing 100. Both ends of the cup holder 750 are inserted into the guide groove 150 and are guided by the guide groove 150 in the entering and going out of the cup holder 750.

An operation of the third embodiment constructed above will be described below.

The cup holder 750 is withdrawn from the casing 100 and the cups 750 are put into the standing groove 751 or the standing hole. Then, both ends of the cup holder 750 are inserted into the guide groove 150 and pushed toward the interior of the casing 100, thereby receiving the cup holder 750.

If the cup holder 750 is received into the casing 100, a filter and a powdered coffee is supplied to the funnel 300. The water tank 200 is supplied with water and then received into the casing 100. If the water tank is received, water is heated by the heater 600 while passing through the water supply tube 500 and supplied to the funnel 300. The coffee filtered in the funnel 300 flows along the coffee flow passages 350 provided at the lower portion of the funnel 300 and drops to several positions. The dropping coffee is stored in the plurality of cups 700 placed in the cup holder 750.

If the coffee is stored in the plurality of cups 700, a user withdraws only the cup when the user keeps indoors or goes out, so that the coffee maker can be conveniently used.

Since the coffee maker according to the third embodiment can store the coffee in a plurality of portable cups, a user can take out and enjoy the coffee at any time. Accordingly, it is convenient and useful for busy modern persons.

As described above, in the first to third embodiments of the present invention, basic technical characteristic is that the coffee maker is installed in the electronic device chamber without changing the microwave oven in size. Further, additional functions are provided in the respective embodiments.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A microwave oven having a coffee maker, comprising:
    a cavity of which front is opened;
    a cavity door for opening/closing the opened front of the cavity;
    an electronic device chamber provided adjacent to the cavity and in which a plurality of elements are installed to radiate microwaves into the cavity;
    a casing of which front is opened and provided at a front side of the interior of the electronic device chamber;
    a water tank provided within the casing;
    a funnel provided so that the funnel can enter and go out of the interior of the casing;
    a heater provided in a lower portion of the casing;
    a water supply tube being provided whose one end is connected to the water tank, the other end is positioned at the upper side of the funnel, and a part thereof is in contact with the heater; and
    a container provided below the funnel so that the container can enter and go out of the interior of the casing.

2. The microwave oven of claim 1, wherein the container is a jug.

3. The microwave oven of claim 1, further comprising a casing door for opening/closing the opened front of the casing.

4. The microwave oven of claim 3, wherein the casing door is hinge-coupled at one side of the front of the casing.

5. The microwave oven of claim 3, wherein the casing door has a surface that is continuous with the cavity door.

6. The microwave oven of claim 1, further comprising a front cover having an opening communicating the interior of the casing with an outside of the casing.

7. The microwave oven of claim 6, further comprising a cover door completely or partially opening/closing the opening of the front cover.

8. The microwave oven of claim 6, wherein the front cover has a surface that is continuous with the cavity door.

9. The microwave oven of claim 7, wherein the cover door has a surface that is continuous with the front cover.

10. The microwave oven of claim 1, wherein the water tank has an entrance which is exposed to the opened front of the casing when the water tank is inserted into the casing.

11. The microwave oven of claim 1, wherein the water tank rotates around a hinge and is hinge-coupled with the casing so that the water tank can enter and go out of the interior by pushing and pulling.

12. The microwave oven of claim 1, wherein the casing further comprises a bracket protruded from an inner wall to an inner space so as to serve as a shelf.

13. The microwave oven of claim 1, wherein the water tank and the funnel are formed in a single body.

14. The microwave oven of claim 13, wherein the funnel is comprised of an outer circumferential surface made concavely in a cone shape.

15. The microwave oven of claim 14, wherein the water tank further comprises a water tank cover formed at an upper portion of the water tank, for opening/closing an entrance of the water tank.

16. The microwave oven of claim 2, wherein the funnel further comprises a coffee discharge valve which is opened by the jug being pushed when the jug is accommodated within the casing.

17. The microwave oven of claim 16, wherein the coffee discharge valve comprises:
an opening/closing member inserted movably up and down into a drop hole formed at a lower portion of the funnel and moved by the jug to open/close the drop hole; and
a spring arranged between the opening/closing member and the funnel, and providing an elastic force to the opening/closing member so as to be closely in contact with the opening/closing member.

18. The microwave oven of claim 17, wherein the opening/closing member comprises:
a stick provided so as to penetrate the drop hole formed at the lower portion of the funnel;
a second end portion widely formed at one end of the stick and pushed up by the jug; and
a first end portion widely formed at the other end of the stick, for opening the drop hole when the second end portion is pushed up in a state that the first end portion closes the drop hole.

19. The microwave oven of claim 18, wherein the spring is provided between the second end portion and the funnel.

20. The microwave oven of claim 18, wherein the coffee discharge valve further comprises an O-shaped ring provided between the lower portion of the funnel and the first end portion so that the first end portion can completely close the drop hole.

21. The microwave oven of claim 18, wherein the second end portion has a lower surface shaped in a bowl so as to decrease friction when the second end portion is in contact with the jug.

22. The microwave oven of claim 21, wherein the second end portion further comprises a plurality of penetration holes formed so as to drop coffee that is introduced through the drop hole and then stays in an upper surface thereof rib.

23. The microwave oven of claim 2, wherein the water tank and the funnel are formed in a single body.

24. The microwave oven of claim 23, wherein the funnel further comprises a coffee discharge valve which is opened by the jug being pushed when the jug is accommodated within the casing.

25. The microwave oven of claim 24, wherein the coffee discharge valve comprises:
an opening/closing member inserted movably up and down into a drop hole formed at a lower portion of the funnel and moved by the jug to open/close the drop hole; and
a spring arranged between the opening/closing member and the funnel, and providing an elastic force to the opening/closing member so as to be closely in contact with the opening/closing member.

26. The microwave oven of claim 25, wherein the opening/closing member comprises:
a stick provided so as to penetrate the drop hole formed at the lower portion of the funnel;
a second end portion widely formed at one end of the stick rib and pushed up by the jug; and
a first end portion widely formed at the other end of the stick, for opening the drop hole when the second end portion is pushed up in a state that the first end portion closes the drop hole.

27. The microwave oven of claim 26, wherein the spring provided between the second end portion and the funnel.

28. The microwave oven of claim 26, wherein the coffee discharge valve further comprises an O-shaped ring provided between the lower portion of the funnel and the first end portion so that the first end portion can completely close the drop hole.

29. The microwave oven of claim 26, wherein the second end portion has a lower surface shaped in a bowl so as to decrease friction when the second end portion is in contact with the jug.

30. The microwave oven of claim 29, wherein the second end portion further comprises a plurality of penetration holes formed so as to drop coffee that is introduced through the drop hole and then stays in an upper surface thereof rib.

31. The microwave oven of claim 1, wherein the water tank is pushed and opened by one end of a water supply tube when the water tank is mounted in the casing, to supply water to the water supply tube.

32. The microwave oven of claim 31, wherein the water supply valve comprises:
a valve body provided to penetrate a portion of the water tank, and including an inner space, an inlet through which the water is introduced, and an outlet through which the water is drained;
a flow passage control plate movably inserted into the inner space of the valve body and which is pushed by one end of the water supply tube in a state that the flow passage control plate closes the outlet, to communicate the inlet with the outlet; and
a valve spring inserted into an inner space of the valve body and providing an elastic force such that the flow passage control plate is closely in contact with the outlet side.

33. The microwave oven of claim 32, wherein the water supply valve further comprises an O-shaped ring provided on an inner circumferential surface of the valve body arranged between the outlet and the flow passage control plate, for preventing leakage.

34. The microwave oven of claim 32, wherein the water supply tube further comprises a pressing pin extending from one end thereof, for opening the outlet of the valve body by pushing the flow passage control plate of the water supply valve when the water tank is mounted in the casing.

35. The microwave oven of claim 34, wherein the one end of the water supply tube has an inner diameter greater than an outer diameter of the valve body such that the valve body is inserted into the interior thereof.

36. The microwave oven of claim 35, wherein the water supply tube further comprises an O-shaped ring provided on an inner circumferential surface of the one end of the water supply tube, for preventing leakage when the valve body is inserted into the one end of the water supply tube.

37. The microwave oven of claim 14, wherein the water tank is pushed and opened by one end of a water supply tube when the water tank is mounted in the casing, to supply water to the water supply tube.

38. The microwave oven of claim 37, wherein the water supply valve comprises:
- a valve body provided to penetrate a portion of the water tank, and including an inner space, an inlet through which the water is introduced, and an outlet through which the water is drained;
- a flow passage control plate movably inserted into the inner space of the valve body and which is pushed by one end of the water supply tube in a state that the flow passage control plate closes the outlet, to communicate the inlet with the outlet; and
- a valve spring inserted into an inner space of the valve body and providing an elastic force such that the flow passage control plate is closely in contact with the outlet side.

39. The microwave oven of claim 38, wherein the water supply valve further comprises an O-shaped ring provided on an inner circumferential surface of the valve body arranged between the outlet and the flow passage control plate, for preventing leakage.

40. The microwave oven of claim 38, wherein the water supply tube further comprises a pressing pin extending from one end thereof, for opening the outlet of the valve body by pushing the flow passage control plate of the water supply valve when the water tank is mounted in the casing.

41. The microwave oven of claim 38, wherein the one end of the water supply tube has an inner diameter greater than an outer diameter of the valve body such that the valve body is inserted into the interior thereof.

42. The microwave oven of claim 41, wherein the water supply tube further comprises an O-shaped ring provided on an inner circumferential surface of the one end of the water supply tube, for preventing leakage when the valve body is inserted into the one end of the water supply tube.

43. The microwave oven of claim 1, wherein the water supply tube further comprises a check valve provided therein to prevent water from flowing backward toward the water tank.

44. The microwave oven of claim 1, wherein the casing further comprises a heating plate contacting with the heater, constituting an inner bottom surface and heated by the heater.

45. The microwave oven of claim 2, wherein the jug comprises:
- a jug body of which the upper side is opened, for receiving and storing coffee dropping from the funnel; and
- a handgrip extending from one side of the jug body.

46. The microwave oven of claim 45, wherein the jug comprises:
- a rim reinforcing member provided along inner and outer circumferences of the opened upper side of the jug body; and
- a jug cover provided so as to open and close the opened upper side of the jug body, and having an introducing hole penetratedly formed such that the coffee dropping from the drop hole of the funnel passes through.

47. The microwave oven of claim 46, wherein the jug further comprises at least one hanger extending from the rim reinforcing member so as to fix and hang an object.

48. The microwave oven of claim 47, wherein the jug further comprises an egg poacher accommodating at least one egg therein, of which part is fixed to the hanger and fixed within the jug body, and comprised of a net.

49. The microwave oven of claim 48, wherein the egg poacher comprises:
- a first member having a concave curved surface for accommodating approximate half of an outer circumferential surface of the egg; and
- a second member having a shape corresponding to the shape of the first member, and hinge-coupled with the first member.

50. The microwave oven of claim 49, wherein the egg poacher further comprises at least one fixing piece which extends from the first member or the second member, and is inserted into the hanger to fix the egg poacher.

51. The microwave oven of claim 49, wherein the egg poacher further comprises:
- a hook protruded from the first member; and
- a second member protruded from the second member such that the hook is hanged and fixed when the second member and the first member are folded.

52. The microwave oven of claim 49, wherein the first and second members have a single concave curved surface formed elongatedly so as to accommodate the eggs in one column therein.

53. The microwave oven of claim 49, wherein the first and second members have two concave curved surface formed elongatedly and parallel with each other so as to accommodate the eggs in two columns therein.

54. The microwave oven of claim 49, wherein the first and second members further comprise a horizontal member protruded inwardly from the concave curved surface to support both sides of the egg mounted in the egg poacher and thus prevent the eggs in the egg poacher from being moved.

55. The microwave oven of claim 54, wherein the horizontal members are arranged at a narrow interval so as to support both sides of the egg in the width direction.

56. The microwave oven of claim 54, wherein the horizontal members are arranged at a wide interval so as to support both sides of the egg in the length direction.

57. The microwave oven of claim 46, wherein the jug comprises a plurality of racks horizontally protruded from the rim reinforcing member toward the interior of the jug body.

58. The microwave oven of claim 57, wherein the rack comprises a slit cut inwardly from an outer circumferential surface thereof so as to fix a string connected to a tea bag or a tea infuser.

59. The microwave oven of claim 57, wherein the rack comprises a fixing groove cut in a wedge shape inwardly from an outer circumferential surface thereof so as to fix a string connected to a tea bag or a tea infuser.

60. The microwave oven of claim 57, wherein the jug further comprises a tea strainer in which tea is received and of which part of upper portion is mounted on the rack and supported such that a lower portion thereof is dipped in the water contained in the jug body.

61. The microwave oven of claim 60, wherein the tea strainer comprises:
- a mesh shaped in a container and of which the upper side is opened; and
- a flange formed along the opened upper circumference of the mesh.

62. The microwave oven of claim 1, wherein the container is a cup.

63. The microwave oven of claim 1, wherein the funnel further comprises a coffee flow passage having a plurality of coffer discharge holes formed at the lower portion of the funnel, through which the coffee filtered in the funnel flows, and discharging the coffee in the downward direction.

64. The microwave oven of claim 63, wherein the container is a plurality of cups provided at the lower portion of the coffee discharge holes of the funnel.

65. The microwave oven of claim 64, further comprising a cup holder on which the plurality of cups are mounted, and provided so that the water tank can enter and go out of the interior by pushing and pulling.

66. The microwave oven of claim 65, wherein the casing further comprises a guide groove concavely formed on both inner surfaces of the casing so that both ends of the cup holder can be inserted, to guide the entering and going out of the cup holder.

67. The microwave oven of claim 65, wherein the cup holder comprises a plurality of standing grooves provided in the upper surface of the cup holder such that the lower portions of the cups are inserted and supported.

68. The microwave oven of claim 65, wherein the cup holder comprises a plurality of standing grooves provided to penetrate the cup holder such that the cups are inserted and supported.

69. The microwave oven of claim 14, wherein the funnel further comprises a coffee flow passage having a plurality of coffer discharge holes formed at the lower portion of the funnel, through which the coffee filtered in the funnel flows, and discharging the coffee in the downward direction.

70. The microwave oven of claim 69, wherein the container is a plurality of cups provided at the lower portion of the coffee discharge holes of the funnel.

71. The microwave oven of claim 70, further comprising a cup holder on which the plurality of cups are mounted, and provided so that the water tank can enter and go out of the interior by pushing and pulling.

72. The microwave oven of claim 71, wherein the casing further comprises a guide groove concavely formed on both inner surfaces of the casing so that both ends of the cup holder can be inserted, to guide the entering and going out of the cup holder.

73. The microwave oven of claim 71, wherein the cup holder comprises a plurality of standing grooves provided in the upper surface of the cup holder such that the lower portions of the cups are inserted and supported.

74. The microwave oven of claim 71, wherein the cup holder a plurality of standing grooves provided to penetrate the cup holder such that the cups are inserted and supported.

* * * * *